(12) United States Patent
Ben Don et al.

(10) Patent No.: US 9,758,980 B2
(45) Date of Patent: Sep. 12, 2017

(54) SYSTEM FOR EXTRACTING A POOL CLEANING ROBOT

(71) Applicant: MAYTRONICS LTD., Kibutz Yizrael (IL)

(72) Inventors: Boaz Ben Don, Ram On (IL); Shay Witelson, Kibutz Yizrael (IL)

(73) Assignee: MAYTRONICS LTD., Kibbuts Yisrael (IL)

( * ) Notice: Subject to any disclaimer, the term of this patent is extended or adjusted under 35 U.S.C. 154(b) by 296 days.

(21) Appl. No.: 14/501,175

(22) Filed: Sep. 30, 2014

(65) Prior Publication Data

US 2015/0102772 A1    Apr. 16, 2015

Related U.S. Application Data

(60) Provisional application No. 61/890,260, filed on Oct. 13, 2013.

(51) Int. Cl.
| | |
|---|---|
| *H02J 7/00* | (2006.01) |
| *H02J 7/14* | (2006.01) |
| *E04H 4/16* | (2006.01) |
| *B66B 9/00* | (2006.01) |
| *B66C 23/46* | (2006.01) |
| *H02J 7/02* | (2016.01) |

(52) U.S. Cl.
CPC ............ *E04H 4/1654* (2013.01); *B66B 9/00* (2013.01); *B66C 23/46* (2013.01); *H02J 7/025* (2013.01); *H02J 7/0013* (2013.01); *H02J 7/0042* (2013.01)

(58) Field of Classification Search
USPC ......... 320/108, 137; 901/1; 15/1.7; 210/143, 210/91, 739; 212/271, 299
See application file for complete search history.

(56) References Cited

U.S. PATENT DOCUMENTS

| | | | |
|---|---|---|---|
| 4,702,331 A | 10/1987 | Hagihara | ................... B25J 5/00 180/8.7 |
| 4,709,773 A | 12/1987 | Clement | .............. B62D 55/065 180/9.32 |
| 4,977,971 A | 12/1990 | Crane, III | ............ B62D 55/075 180/8.3 |

(Continued)

FOREIGN PATENT DOCUMENTS

| | | |
|---|---|---|
| DE | 4344045 | 7/1996 |
| EP | 206930 | 12/1986 |

(Continued)

*Primary Examiner* — Alexis Pacheco
(74) *Attorney, Agent, or Firm* — Reches Patents

(57) ABSTRACT

A system for extraction of a pool cleaning robot from a pool, the system may include a pool cleaning robot interface that is arranged to be coupled to a pool cleaning robot during an exit process during which the pool cleaning robot is extracted from the pool; and a pool cleaning robot manipulator that is coupled to the pool cleaning robot interface, wherein the pool cleaning robot manipulator is arranged to move the pool cleaning robot interface between a first and second portion; wherein when the pool cleaning robot interface is at the first position and is coupled to the pool cleaning robot, the pool cleaning robot is within the pool; wherein when the pool cleaning robot interface is at the second position and is coupled to the pool cleaning robot, the pool cleaning robot is positioned outside the pool.

16 Claims, 19 Drawing Sheets

(56) References Cited

U.S. PATENT DOCUMENTS

| | | | |
|---|---|---|---|
| 8,157,032 B2 | 4/2012 | Gettings | B62D 55/075 180/7.1 |
| 8,661,595 B2 | 3/2014 | Bernini | |
| 2007/0194540 A1 | 8/2007 | Caspi | B62B 5/02 280/5.22 |
| 2008/0179115 A1 | 7/2008 | Ohm | B25J 5/005 180/9.21 |
| 2009/0057238 A1* | 3/2009 | Garti | E04H 4/1654 210/739 |
| 2010/0307545 A1* | 12/2010 | Osaka | A01K 61/003 134/198 |
| 2011/0061951 A1 | 3/2011 | Gal | B62D 55/065 180/8.7 |
| 2012/0066846 A1 | 3/2012 | Yu | B62D 7/028 15/1.7 |
| 2013/0104321 A1 | 5/2013 | Michaleon | |
| 2014/0077587 A1 | 3/2014 | Smith | B63B 59/10 305/15 |
| 2014/0261540 A1 | 9/2014 | Renaud | E04H 4/1654 134/6 |
| 2015/0251739 A1* | 9/2015 | Ryuh | B25J 11/00 114/338 |

FOREIGN PATENT DOCUMENTS

| | | | | |
|---|---|---|---|---|
| EP | 636533 | | 2/1995 | |
| EP | 1502843 | | 2/2005 | |
| FR | 2742351 | A1 | 6/1977 | |
| JP | 60-18464 | | 1/1985 | |
| JP | 63-222982 | | 9/1988 | |
| JP | 3-279087 | | 12/1991 | |
| KR | 1003967 | * | 12/2010 | H02J 17/00 |
| WO | WO2012000031 | A2 | 1/2012 | |
| WO | WO2016196169 | A1 | 12/2016 | |
| WO | WO2016196433 | A1 | 12/2016 | |
| WO | WO2016196622 | A1 | 12/2016 | |

* cited by examiner

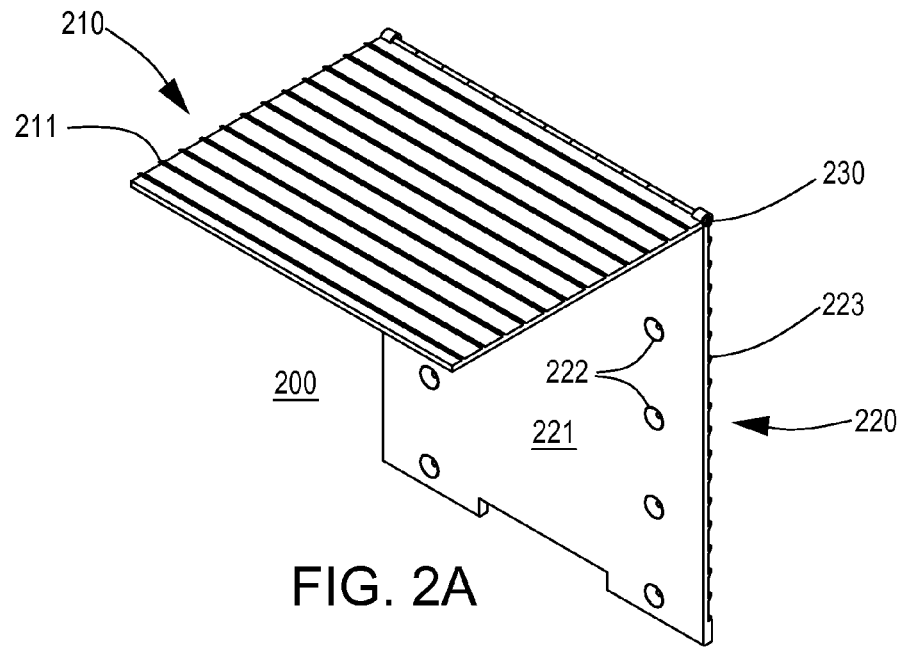
FIG. 2A
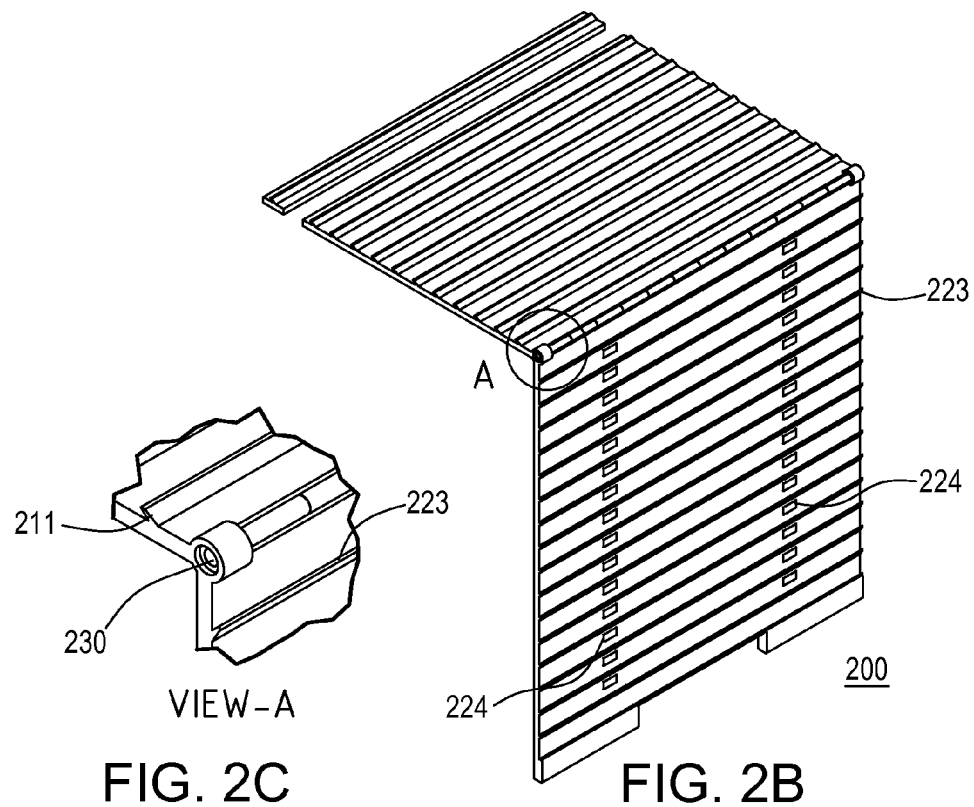
VIEW-A
FIG. 2C
FIG. 2B

SYSTEM FOR EXTRACTING A POOL CLEANING ROBOT

RELATED APPLICATIONS

This application claims the benefit of U.S. provisional patent Ser. No. 61/890,260 filing date Oct. 13, 2013 which is incorporated herein by reference in its entirety.

BACKGROUND

There is a growing need to reduce the human intervention in cleaning pools. It is well known that pool cleaners or pool robots usually need to be immerged or retrieved manually from or into a swimming pool. Retrieval may be performed by grabbing and pulling the electrical or by means of a special pike with a hook. Immersion can be performed by grabbing and lifting the cleaner by its handle and immersing it manually into the water. These are time consuming operations, difficult at times. The intention of this invention is to improve on the basic rule which govern the method of pool cleaner handling by introducing an almost fully automatic and autonomous pool cleaner which seldom needs any manual intervention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which

FIG. 2A-2B illustrate an interfacing device according to an embodiment of the invention;

FIG. 2C illustrates a portion of an interfacing device according to an embodiment of the invention;

Figure 1A:
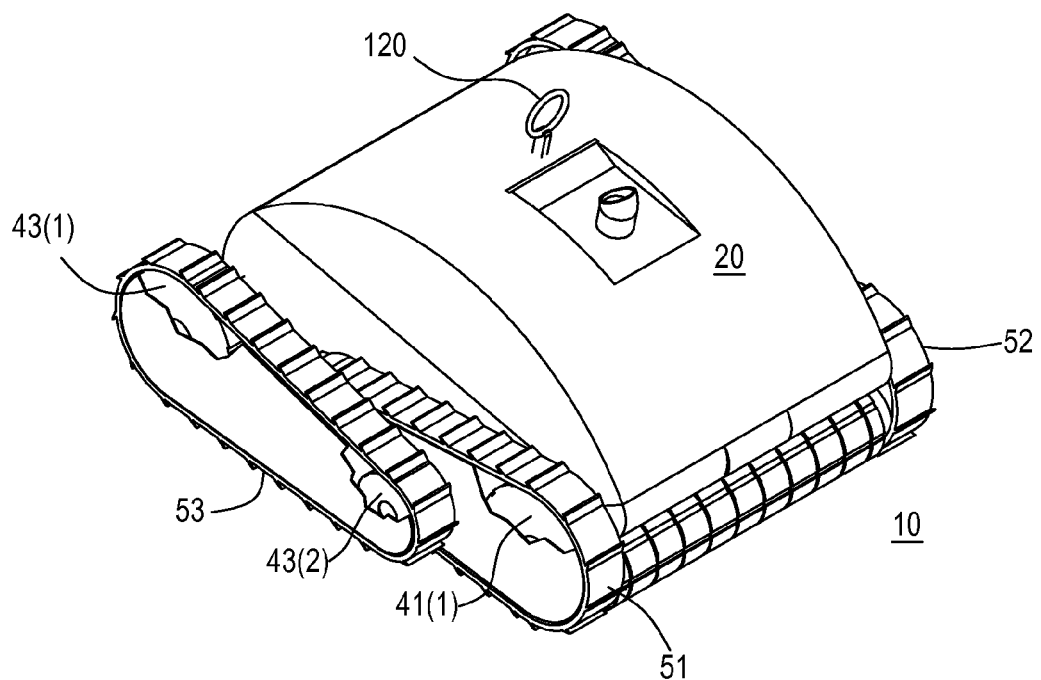
FIG. 1A illustrates a pool cleaning robot according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

SUMMARY

According to an embodiment of the invention there may be provided a system for extraction of a pool cleaning robot from a pool, the system may include: a pool cleaning robot interface that is arranged to be coupled to a pool cleaning robot during an exit process during which the pool cleaning robot is extracted from the pool; and a pool cleaning robot manipulator that is coupled to the pool cleaning robot interface, wherein the pool cleaning robot manipulator is arranged to move the pool cleaning robot interface between a first and second portion; wherein when the pool cleaning robot interface is at the first position and is coupled to the pool cleaning robot, the pool cleaning robot is within the pool; wherein when the pool cleaning robot interface is at the second position and is coupled to the pool cleaning robot, the pool cleaning robot is positioned outside the pool.

The pool cleaning robot manipulator and the pool cleaning robot interface may be included in a crane.

The crane may include an arm that has an arm end that is movable along a horizontal axis.

The system may include a pool cleaning robot base; wherein the crane is arranged to position the pool cleaning robot on the pool cleaning robot base.

The system may include a first contactless charging element that is arranged to (a) be fed by the electrical supply module and (b) generate an electromagnetic field during at least one period during which a second contactless charging element of the pool cleaning robot is within a charging range from the first contactless charging element, and wherein the electromagnetic field charges the second contactless charging element.

The crane may be powered at least in part by a pool circulation system that is arranged to circulate fluid in the pool.

The crane may include a turbine that is arranged to convert a flow of fluid supplied by the pool circulation system to an electrical power.

The system may include a motor and a transmission system, wherein the transmission system is arranged to couple the motor to a pulley of the crane and to a wheels or tracks of a system drive system.

The pool cleaning robot manipulator may be an elevator drive system.

The pool cleaning robot interface may be a supporting element that is arranged to support the pool cleaning robot when the pool cleaning robot is positioned on the supporting element.

The system may include a supporting element manipulator for moving the supporting element between a folded position and an unfolded position.

The elevator drive system may be powered at least in part by a pool circulation system that is arranged to circulate fluid in the pool.

The elevator drive system may include a turbine that is arranged to convert a flow of fluid supplied by the pool circulation system to an electrical power.

The system may include a washing device for washing the pool cleaning robot, when the pool cleaning robot is out of the pool.

The system may include a charging device for charging the pool cleaning robot, when the pool cleaning robot is out of the pool.

The system may include a filter exchanging device for exchanging a filter of the pool cleaning robot, when the pool cleaning robot is out of the pool.

The pool cleaning robot manipulator may be powered at least in part by a pool circulation system that is arranged to circulate fluid in the pool.

The system may include a propulsion system for moving the system in relation to the pool.

DESCRIPTION OF THE PREFERRED EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Any reference in the specification to a system should be applied mutatis mutandis to a method that can be executed by the system.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method.

There is provided a pool cleaning robot that can, without human intervention, exit the pool, be cleaned, can have its filter replaced, electrically charged and resume to work. In this specification the terms "autonomous", "automatic", "independent" and "without human intervention" are used in an interchangeable manner.

In the following text any reference to a movement of the pool cleaning robot (or cleaning of) a bottom of a pool may refer to a movement (or cleaning) of the pool cleaning robot along any surface of the pool (including a pool sidewall).

Autonomous Pool Cleaning Robot

Pool cleaning robots are arranged to climb sidewalls of pools but are not arranged to exit the pools. When progressing from climbing a sidewall to exiting a pool the pool cleaning robot can fall back to the fluid of the pool. Thus according to an embodiment of the invention there is provided a backup and securing mechanism for the pool cleaning robot to not detach from the wall before it "settles" on the designated scope.

The pool cleaning robot, may include conveyor systems which includes joints which include wheels and/or caterpillar or tracks. Wheel/caterpillar or track system can be referred to as the central drive system and is responsible for the driving, movement and rotation of the robot around the pool and can be equivalent to the propulsion system of known robots of Maytronics Ltd or other vendors.

According to an embodiment of the invention to each wheel of caterpillar or track of central driving system there may be connected a pair of auxiliary forward and/or rear arms which are pivotally attached to the main body or to the drive system's one or more sub-systems of the joints wheels and/or unique caterpillars or tracks which are used to enter and exit the water and which form an auxiliary drive system.

It can be seen that two auxiliary drive systems can turn around (all 360 degrees) around the axis that connects them to the central drive wheels. The central drive wheels, propelling the robot in the water will also help the entrance/exit facility dedicated but given the high friction, portability out of the water (by the pool or on pool deck) will be using the unique propulsion sub-system which is constructed of resistant materials with higher coefficients of friction and wear.

In other configurations, the tracks have hook type threads and/or internal metal parts that can be molded in (or otherwise included in) the auxiliary drive system. The wheels can include embedded metals that can be included into the rigid plastic. The wheels can also be made of high friction coefficient rubber that includes the metal parts.

According to an embodiment of the invention there is provided a pool cleaning robot that can autonomously exit a pool.

Figure 1B:
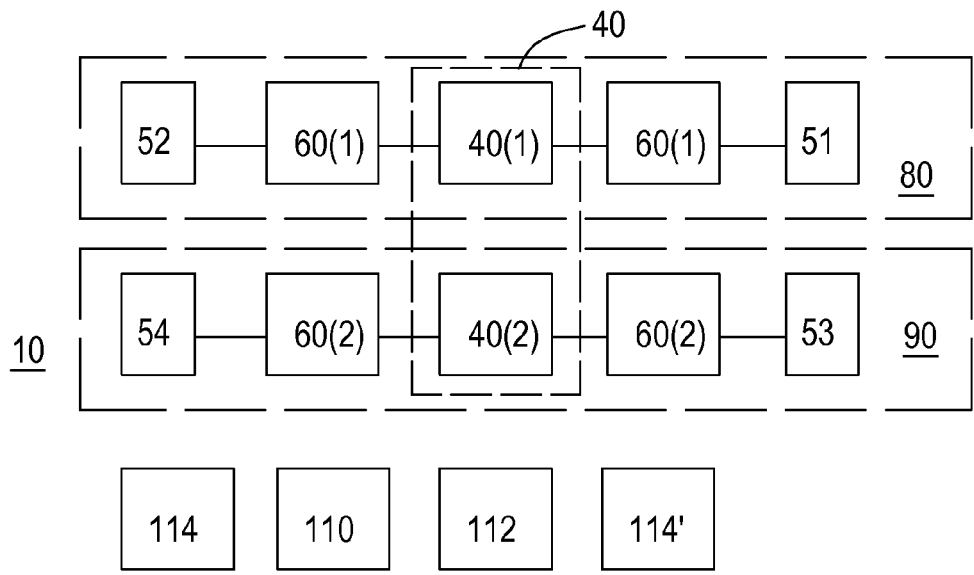
FIG. 1B illustrates a pool cleaning robot according to an embodiment of the invention.
Figure 1B:
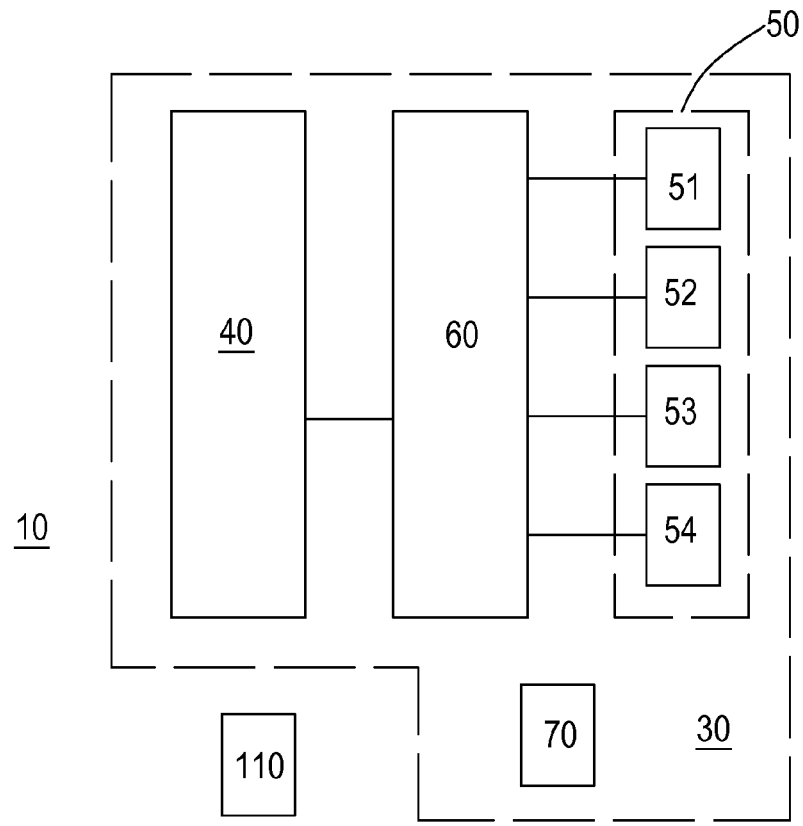

FIG. 1A illustrates a pool cleaning robot 10 according to an embodiment of the invention. FIG. 1B is a block diagram of a pool cleaning robot 10 according to an embodiment of the invention.

The pool cleaning robot 10 includes a housing 20 and a drive system 30 that is arranged to move the pool cleaning robot 10 in relation to an environment of the pool cleaning robot. The environment includes a pool surface and an exterior surface.

Referring to FIG. 1B the drive system 30 may include a drive motor system 40, a group 50 of interfacing modules, a transmission system 60 and an interface manipulator 70. The pool cleaning robot 10 also includes controller 110, filtering path 112 (including an inlet, an outlet, a filter, an impeller, a pump motor and the like), and power source 114 (battery, turbine, generator and/or power input such as a port or a wireless charging element 114' (not shown), a power cable (shown on cable drum reel in FIG. 4C) and the like).

The controller 110 may control the operation of the components of the pool cleaning robot. It can, for example, trigger an exit of the pool cleaning robot from the pool if sensing that a filtering unit is clogged, the battery is empty, and/or if a time for performing an exit process arrived.

FIG. 1A also illustrates a fastening element such as ring 120 for fastening the pool cleaning robot to an elevating unit that is arranged to elevate the pool cleaning robot outside the pool. The ring 120 may have other shapes such as a handle. It may be a mechanical element and/or a magnet.

The drive motor system 40 may include one or more drive motors. The drive motors may be electrical motors, hydraulic motors, or any type of motors that generate a mechanical movement that is harnessed from moving the pool cleaning robot 10.

The transmission system 60 is arranged to couple the drive motor system 40 to the group 50 of interfacing modules. The transmission system 60 may comprise joints, wheels, gears, chains, strings, tracks or any other components that can convert the mechanical movement generated by the drive motor system 40 to a movement of the interfacing elements of the group. It is noted that the transmission system may use contact based power transmission (for example meshed gears) and, additionally or alternatively contactless based power transmission (for example magnet based contactless power transmission). Stepper or servo motors may be used coupled with, for example, a clutch mechanism for fine tuning track movements or arms rotations.

The interfacing modules of the group 50 are arranged to interface between the pool cleaning robot and the environment of the pool cleaning robot. Non-limiting examples of interfacing modules include wheels, tracks (caterpillars), mechanical arms and the like.

The interface manipulator 70 is arranged to change a spatial relationship between (a) the housing and (b) a selected interfacing module of the group, during an exit process during which the pool cleaning robot exits the pool. FIGS. 1A and 3A-3G illustrate a change of spatial relationship that is achieved by rotation but other movements between the housing and the selected interfacing module can be used—including linear movements or other non-rotational movements.

For simplicity of explanation it is assumed (and FIG. 1B shows) that the pool cleaning robot has four interfacing modules 51, 52, 53, 54. Assuming that the pool cleaning robot has a front end and a rear end then the four interfacing modules include a right rear interfacing module 53, a left rear interfacing module 54, a right front interfacing module 51 and left front interfacing module 52.

It is noted that the interfacing module may differ by size, shape and type. For example one or more interfacing modules may be a track while yet at least one other interfacing module may be wheel.

It is further noted that the number of interfacing modules may exceed four, may be between one and three.

It is further noted that the interfacing module may be arranged in a symmetrical or non-symmetrical manner in relation to the housing. The number of interfacing modules per each side of the housing may be the same or may differ from one side to another.

Figure 3A:
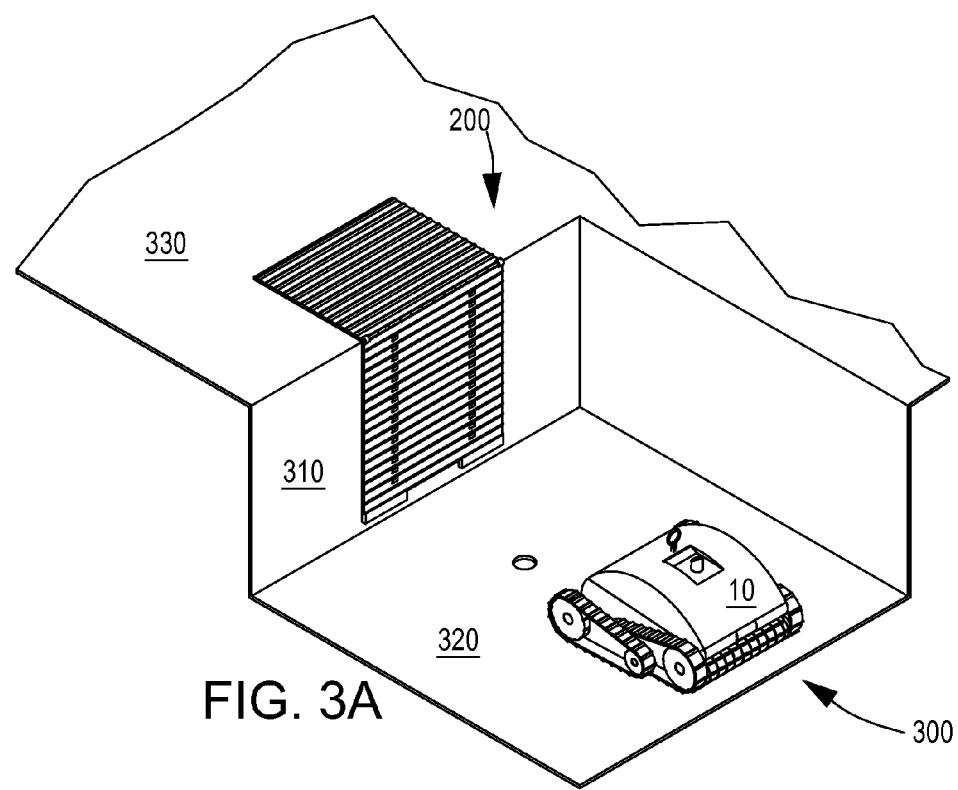
FIG. 3A illustrates a pool cleaning robot that after location identification and navigation to moves on a bottom of a pool towards an interfacing element according to an embodiment of the invention.
Figure 3B:
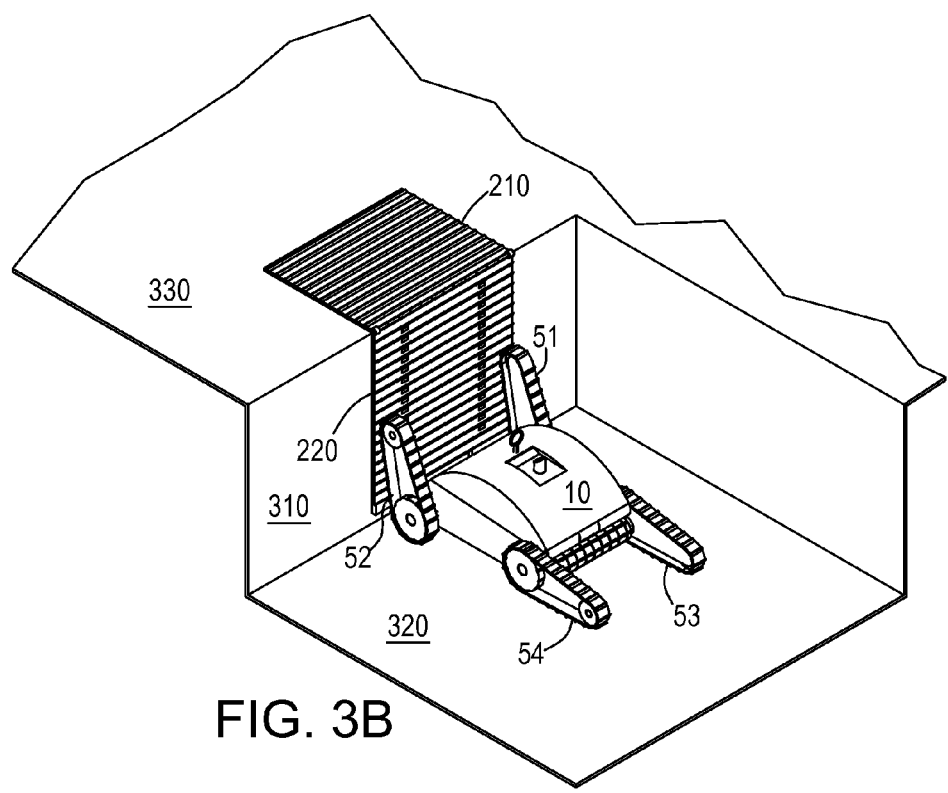
FIG. 3B illustrates a first phase of an exit process in which front tracks of a pool cleaning robot interface with a pool sidewall interface of an interfacing device while rear tracks of the pool cleaning robot are positioned on the bottom of the pool according to an embodiment of the invention.
Figure 3C:
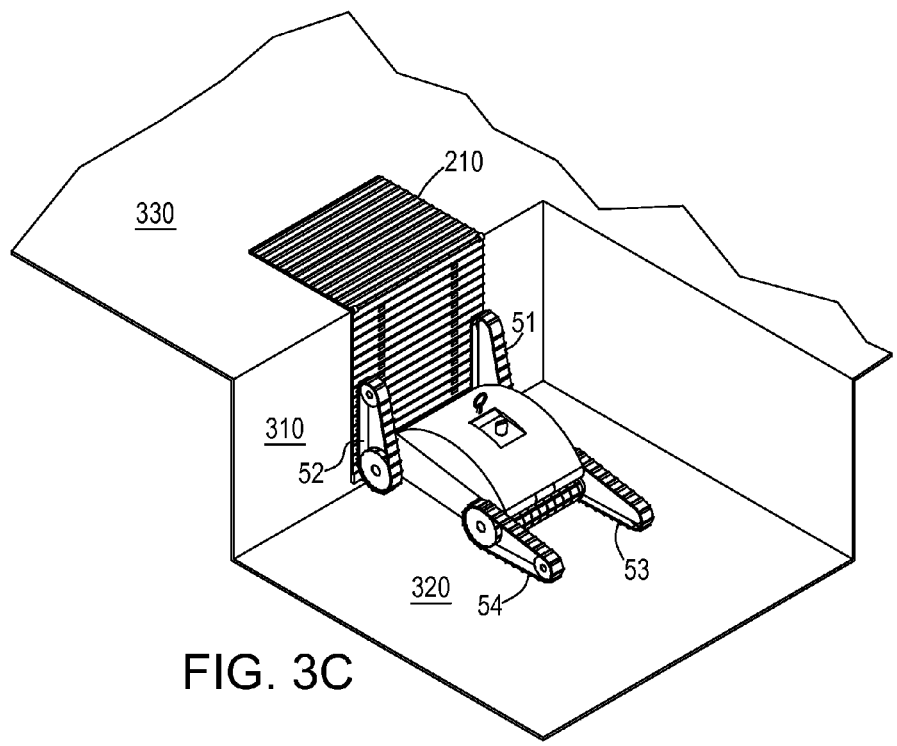
FIG. 3C illustrates a second phase of an exit process in which a pool cleaning robot starts climbing a pool sidewall interface of an interfacing device according to an embodiment of the invention.

FIGS. 1A and 3A-3G illustrate a pool cleaning robot that has four interfacing modules 51-54 that are tracks. It is noted that additional and/or other interfacing modules can be included in the pool cleaning robot. For example—the front wheels may rotate while the rear tracks may be fixed. This may be achieved by electronic means that are controlled by a controller that encompasses a gyroscope and/or other tilt sensor that keeps the cleaning robot aligned. In addition, the movement illustrated in FIGS. 3B and 3C shows a front arm rotation with—even though the rear tracks might be endlessly moving—and the rear arms may be fixed and non-rotating.

FIG. 1B illustrates that the drive system 30 has main portion 80 and an auxiliary portion 90. The main portion 80 is arranged to move the pool cleaning robot in relation to a bottom of the pool during cleaning operations wherein the auxiliary portion 90 is arranged to move the pool cleaning robot during the exit process and during an entrance process.

It is noted that the auxiliary portion 90 may be used only during exit and/or entrance processes of the pool cleaning robot 10 (from and in the pool). Alternatively, the auxiliary portion 90 may also be used during cleaning operations and movements that are not part of the exit and/or entrance processes of the pool cleaning robot 10.

When not used one or more interface modules of the auxiliary may be positioned in a position in which they fully contact, only partially contact or do not contact the surface (such as a bottom of the pool) on which the pool cleaning robot moves. For example, interfacing modules 53 and 54 may be positioned in an elevated state in which they do not contact or only partially contact the bottom of the pool when the pool cleaning robot contacts that bottom.

The main portion 80 and the auxiliary portion 90 may share one or more components or may each have only their own (not shared) distinct components.

For example, both main portion 80 and auxiliary portion 90 may share the drive motor system 40 although each of these portions (80 and 90) may have its separate engines.

In FIG. 1B the main portion 80 is shown as including front engine 40(1) of drive motor system 40, right front interfacing module 51, left front interfacing module 52 and a first portion 60(1) of the transmission system 60.

Assuming that the interfacing modules are tracks then right front interfacing module 51 and left front interfacing module 52 may form a first sub-group of tracks 50(1).

The auxiliary portion 90 is shown as including rear engine 40(2) of drive motor system 40, right rear interfacing module 53, left rear interfacing module 54 and a second portion 60(2) of the transmission system 60.

Assuming that the interfacing modules are tracks then right rear interfacing module 51 and left rear interfacing module 52 may form a second sub-group of tracks 50(2).

Referring to FIGS. 1A and 3A-3G, each one of interfacing modules 51-54 is mounted on a pair of wheels (41(1) and 41(2)), (42(1) and 42(2)), (43(1) and 43(2)) and (44(1) and 44(2)) respectively and is rotated by at least one of the wheels of each pair of wheels.

These pairs of wheels (41(1) and 41(2)), (42(1) and 42(2)), (43(1) and 43(2)) and (44(1) and 44(2)) are part of the transmission system 40.

The wheels of each pair of wheels differ from each other by size (for example—wheels 41(1)-44(1) are bigger than wheels 41(2)-44(2)) but the wheels of each pair may be of the same size.

In FIGS. 1A and 3A-3G interfacing module 51 and wheels 41(1) and 41(2) positioned between (a) a sidewall of the housing 20 and (b) interfacing module 53 and wheels 53(1) and 53(2). It is noted that both interfacing modules 51 and 53 may be positioned in different manners in relation to each other. For example—both may be positioned at the same imaginary plane.

In FIGS. 1A and 3A-3G interfacing module 52 and wheels 42(1) and 42(2) are positioned between (a) a sidewall of the housing 20 and (b) interfacing module 54 and wheels 44(1) and 44(2). It is noted that both interfacing modules 51 and 53 may be positioned in different manners in relation to each other. For example—both may be positioned at the same imaginary plane.

FIGS. 1A and 3A illustrate the interfacing modules 51-54 in a folded position while FIGS. 3B-3F illustrate the interfacing modules 51-54 in a non-folded position.

When positioned in a folded position an overlap between an interfacing module and at least one of a housing 20 or another interfacing module is smaller than the corresponding overlap when in a non-folded position.

In FIGS. 1A and 3A all interfacing modules 51-54 are shown in a folded position in which they do not extend (or only slightly extend) outside housing 20.

In FIGS. 3B-3F all interfacing modules 51-54 are shown in a non-folded position in which they extend (substantially) outside housing 20.

It is noted that although FIGS. 1A and 3A-3G illustrate that all interfacing modules 51-54 change their position during an exit process this is not necessarily so and only some (or even none) of the interfacing elements may change their position. The change in position can be an outcome of a rotation, a linear movement, a non-linear movement or a combination thereof.

FIGS. 1A and 3A-3G illustrate each track as having external protuberances such as fins 51'-54' that may be shaped and sized to mesh and/or be attached to attached to corresponding protuberances (and/or voids) formed in an interfacing device over which the pool cleaning robot climbs during the exit process.

Figure 1C:
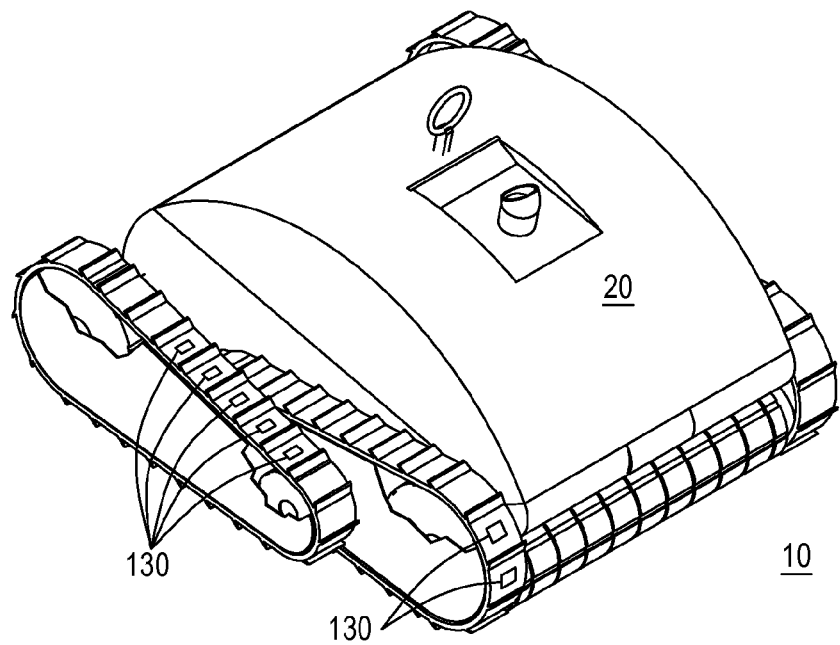
FIG. 1C illustrates a pool cleaning robot according to an embodiment of the invention.

FIG. 1C illustrates a pool cleaning robot 10 that includes interfacing modules that include add on attachment or molded—in elements such as ferromagnetic elements 130 for attaching the pool cleaning robot to an interface device that has corresponding magnets (of reverse polarity) or ferromagnetic elements.

FIGS. 3A-3G illustrate an exit process of a robot according to an embodiment of the invention. The exit process may be reversed during an entrance process in which the pool cleaning robot enters the pool. In this case FIGS. 3A-3G illustrate (in a reverse order) an entrance process of a robot. It is noted that the entrance process may differ from the exit process. For example, the pool cleaning robot may just drive into the pool and enter the pool without contacting the pool sidewall interfacing element.

During the exit process the front tracks of the pool cleaning robot perform a clockwise rotation from being horizontal (parallel to the pool bottom) to be vertical (parallel to the pool sidewall interface) and then perform a counterclockwise rotation from being vertical to being horizontal (parallel to the exterior surface interface). The rear tracks follow the path of the front tracks with a certain delay.

FIG. 3A illustrates a pool cleaning robot 10 that moves on a bottom 320 of a pool 300 towards an interfacing device 200 according to an embodiment of the invention. The pool cleaning robot may navigate towards the interfacing device using any navigation method including beacon based navigation. It is noted that interfacing device 200 may include a water sealed embedded battery operated two way communications relay device comprising a PCB with aerial/antenna and Bluetooth component that may enable two-way communications between the submerged cleaning robot and an external docking station and/or a portable device.

FIG. 3B illustrates a first phase of an exit process in which front tracks 51 and 52 of pool cleaning robot 10 interface with a pool sidewall interface 220 of interfacing device 200 while a rear tracks 53 and 54 of the pool cleaning robot 10 is positioned on the bottom 320 of the pool according to an embodiment of the invention. At the end of the first phase the pool cleaning robot did not start climbing but is ready for climbing.

The upper part of front tracks 51 and 53 contact the pool sidewall interface 220 while the lower part of front tracks does not contact the pool sidewall interface 220. Rear tracks 53 and 54 are placed on the bottom 320 of the pool 300. The pool sidewall interface 220 may have a smooth inner surface 221 or a non-smooth surface.

FIG. 3C illustrates a second phase of an exit process in which a pool cleaning robot 10 starts climbing a pool sidewall interface of an interfacing device according to an embodiment of the invention.

In FIG. 3C the front of the pool cleaning robot is slightly elevated.

Front tracks 51 and 52 contact (and are parallel to) the pool sidewall interface 220. Rear tracks are placed on the bottom 320 of the pool 300.

Figure 3D:
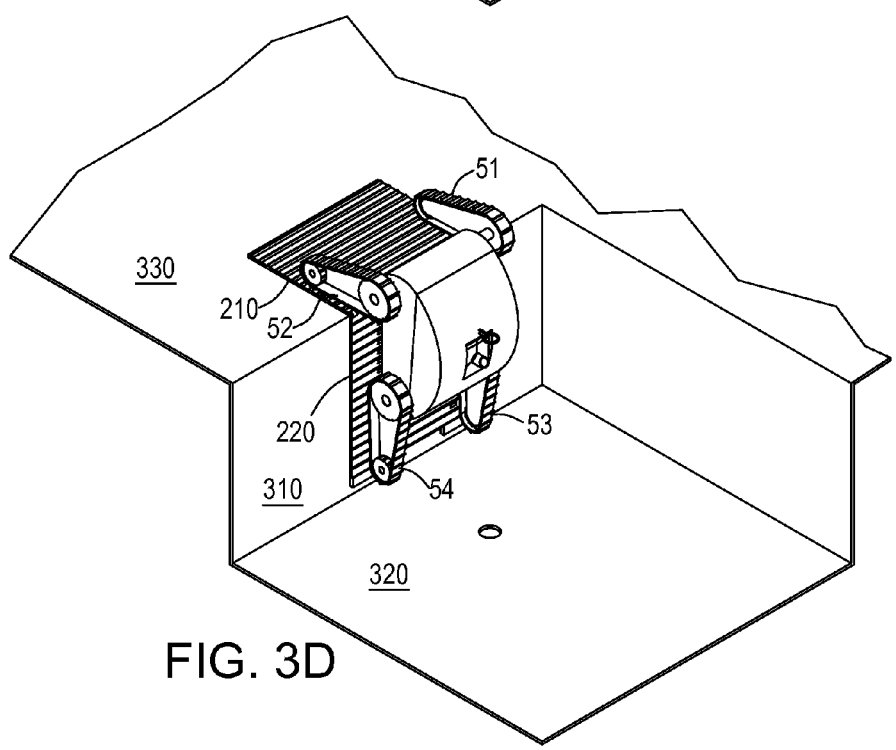
FIG. 3D illustrates a third phase of an exit process in which front tracks of the pool cleaning robot interface with and are parallel to an external surface interface while rear tracks of the pool cleaning robot interface with and are parallel to a pool sidewall interface of an interfacing device according to an embodiment of the invention.

FIG. 3D illustrates a third phase of an exit process in which front tracks 51 and 52 of the pool cleaning robot 10 interface with and are parallel to an external surface interface 210 of interfacing device 200. Rear tracks 53 and 54 interfaces with and are parallel to pool sidewall interface 220 according to an embodiment of the invention.

It is noted that if the bottom of the pool and the exterior surface are spaced enough from each other then there may be a phase (between the third and fourth phases) in which both front and rear tracks interface with the pool sidewall interface (and both may be parallel to each other).

Figure 3E:
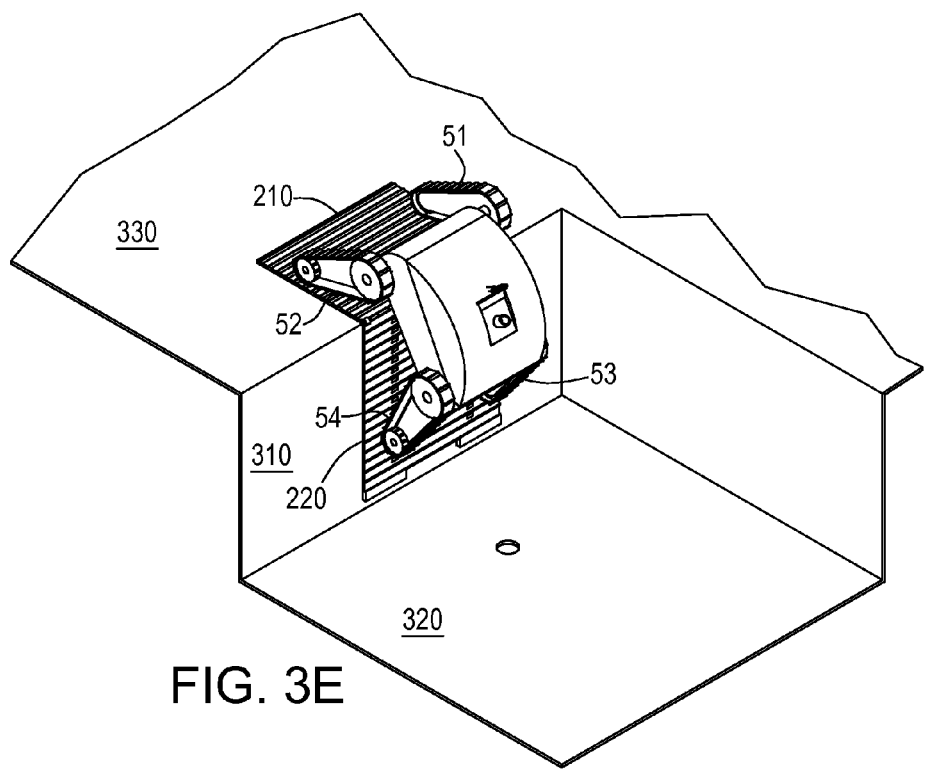
FIG. 3E illustrates a fourth phase of an exit process in which front tracks of the pool cleaning robot interface with and are oriented in relation to an external surface interface while rear tracks of the pool cleaning robot interface with and are oriented to a pool sidewall interface of an interfacing device according to an embodiment of the invention.

FIG. 3E illustrates a fourth phase of an exit process in which front tracks 51 and 52 of the pool cleaning robot interface with and are oriented in relation to an external surface interface 210 while rear tracks 53 and 54 of the pool cleaning robot interface with and are oriented to a pool sidewall interface 220 of an interfacing device according to an embodiment of the invention.

Figure 3F:
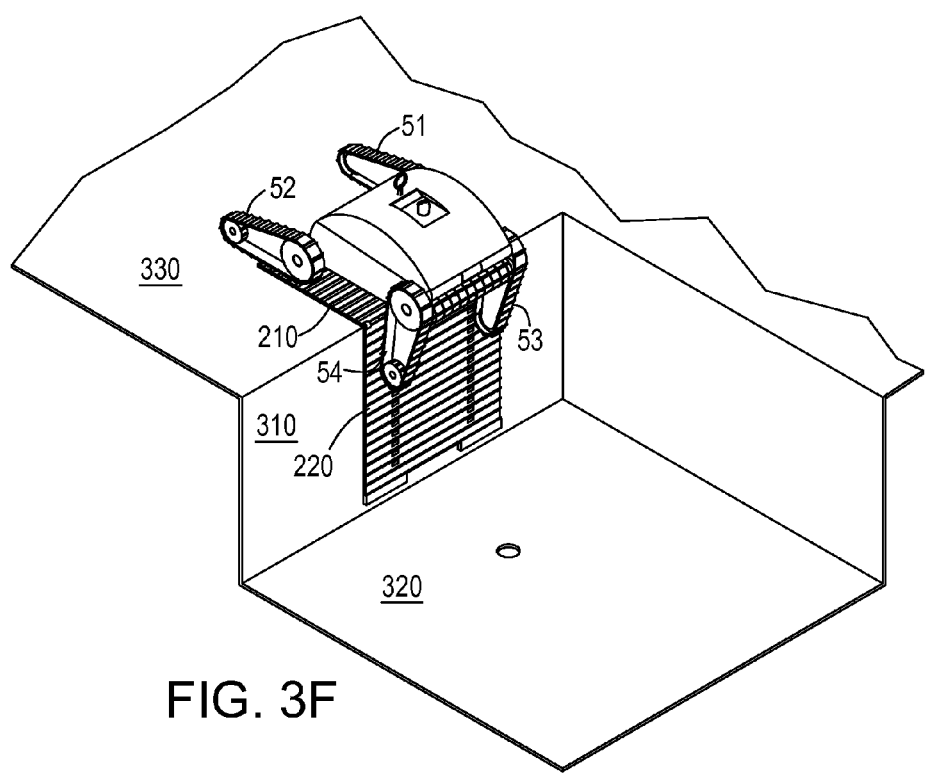
FIG. 3F illustrates a fifth phase of an exit process in which front tracks of the pool cleaning robot partially pass an external surface interface while rear tracks of the pool cleaning robot interface with and are oriented to a pool sidewall interface of an interfacing device according to an embodiment of the invention.
Figure 3G:
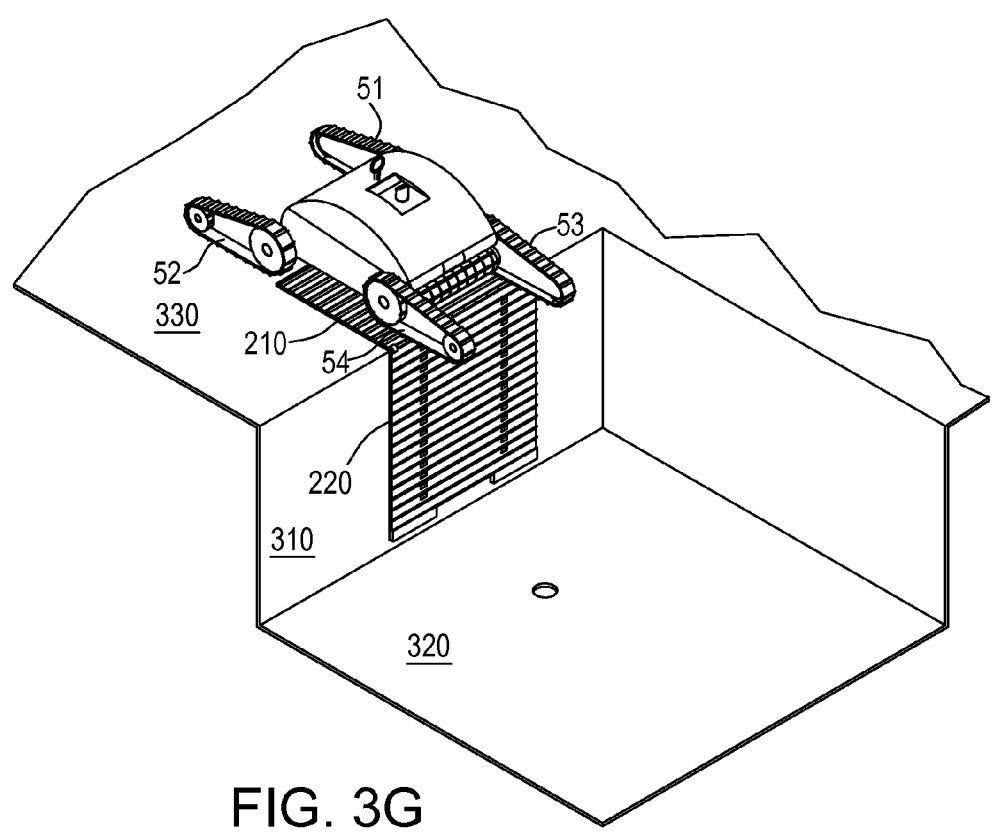
FIG. 3G illustrates a sixth phase of an exit process in which the entire pool cleaning robot is out of the pool according to an embodiment of the invention.

FIG. 3F illustrates a fifth phase of an exit process in which front tracks 51 and 52 of the pool cleaning robot 10 partially pass an external surface interface 210 while rear tracks 53 and 54 of the pool cleaning robot 10 interface with and are oriented to a pool sidewall interface 220 of an interfacing device 200 according to an embodiment of the invention;

FIG. 3G illustrates a sixth phase of an exit process in which the entire pool cleaning robot 10 is out of the pool according to an embodiment of the invention. When entering the pool the order of phases may be reversed.

Interfacing Device

FIGS. 2A-2C illustrate an interfacing device 200 according to an embodiment of the invention.

Interfacing device 200 may include pool sidewall interface 220 and an external surface interface 210 that may be oriented to each other (for example by ninety degrees).

At least one (or none) of the external surface interface 210 and the pool sidewall interface 220 may include magnets such as magnets 224 of pool sidewall interface 220.

At least one (or none) of the external surface interface 210 and the pool sidewall interface 220 may include (at its internal side) attachment elements such as adhesive elements (such as a double sided adhesive tape), screws, vacuum nipples or suction cups 222 for connecting the interfacing device 200 to the side wall of the pool and to the external surface.

It is noted that although FIGS. 2A-2C illustrates the interfacing device as including two non-flat sheets that other interfacing elements may be used. For example, at least one of the external surface interface and the pool sidewall interface may be made of a group of elements (such as ribs) that are connected to each other (in a detachable or non-detachable manner).

The pool sidewall interface 220 of different lengths may be provided in order to allow it to fit to pools of different depths or to provide different penetration levels to the fluid in the pool (at least 10 cm and even till the bottom of the pool). Alternatively, the pool sidewall interface 220 may include multiple portions that can be connected to each other in order to provide a pool sidewall interface of different lengths (see, for example FIG. 2B).

At least one (or none) of the external surface interface 210 and the pool sidewall interface 220 may include a non-flat surface for interfacing with the pool cleaning robot during the exit process.

FIGS. 2A-2C illustrate the external surface interface 210 as having fins 211 that extend upwards and away from the pool. FIGS. 2B-2C illustrate the pool sidewall interface 220 as having fins 223 that extend upwards (while being not normal to the pool sidewall interface 220). These fins may be integrated onto a slat strip that extend the entire width of the sidewall interface. The fins and/or the slats can be replaced by any other sized and shaped protuberances. The length of the external surface interface and/or the pool sidewall interface may be adjusted by the addition or retraction of finned slats. Additionally or alternatively one or more of the external surface interface 210 and the pool sidewall interface 220 may include only depressions and/or a combination of depressions and protuberances. These figures also show that an edge of interfacing device—formed between the external surface interface 210 and the pool sidewall interface there may be a roller 230—that may rotate about its axis and may ease the exit process of the cleaning robot. The roller 230 may be fastened to other parts of the interfacing device by rings and/or friction bearings or any other manner. The roller may have a cylindrical shape. There may be more than one roller. The roller may be smooth or may have a non-smooth surface. The roller 230 may assist in the contact with the bottom external surface "underbelly" of the pool cleaner (not shown) in order to reduce friction and enable a smooth and rolled exit/entry of the pool cleaner.

The shape and size of any depressions and protuberances may match the shape and size of depressions and protuberances of the interfacing modules.

System for Extracting a Pool Cleaning Robot

Figure 4A:
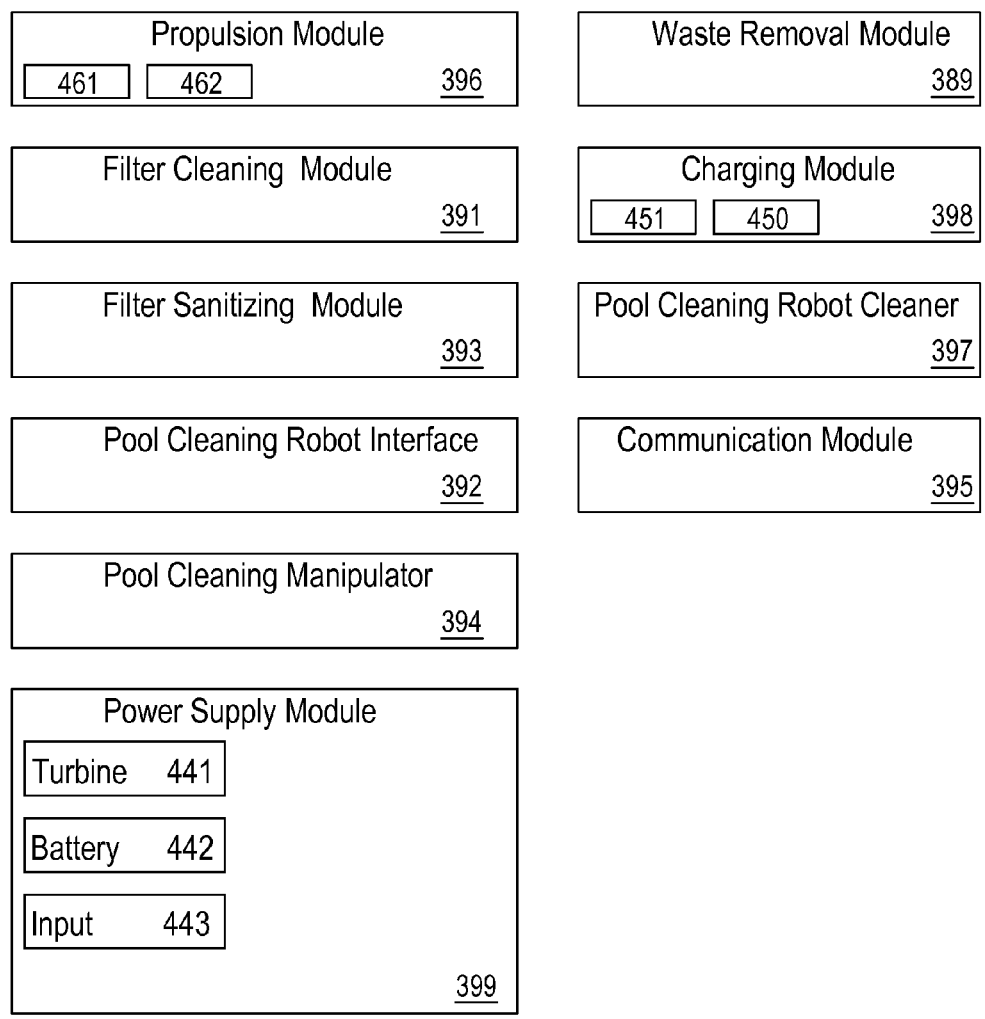
FIG. 4A illustrates a system according to an embodiment of the invention.

FIG. 4A illustrates system 390 for extraction of a pool cleaning robot from a pool, according to an embodiment of the invention.

System 390 includes a pool cleaning robot interface 392 that is arranged to be coupled to a pool cleaning robot during an exit process during which the pool cleaning robot is extracted from the pool.

Figure 4B:
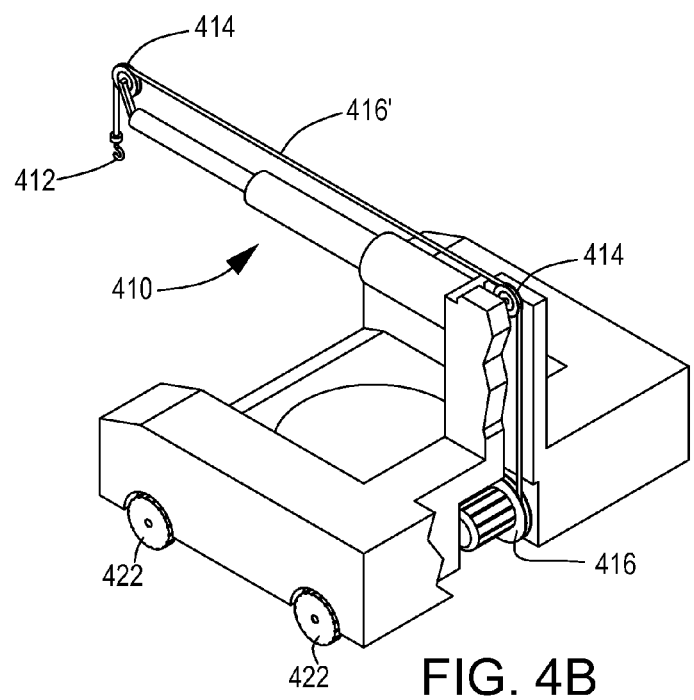
FIG. 4B illustrates an automatic system that includes crane for extracting a pool cleaning robot, according to an embodiment of the invention.

System 390 also includes a pool cleaning robot manipulator 394 that is coupled to the pool cleaning robot interface, wherein the pool cleaning robot manipulator is arranged to move the pool cleaning robot interface between a first and second positions. For example—the pool cleaning robot interface may be hook of FIG. 4B or the ramp 510 of FIG. 6A and the pool cleaning robot manipulator may be an element (or elements) that move the hook (for example—other parks of the crane of FIG. 4B, the elevator of FIG. 6A).

Figure 5A:
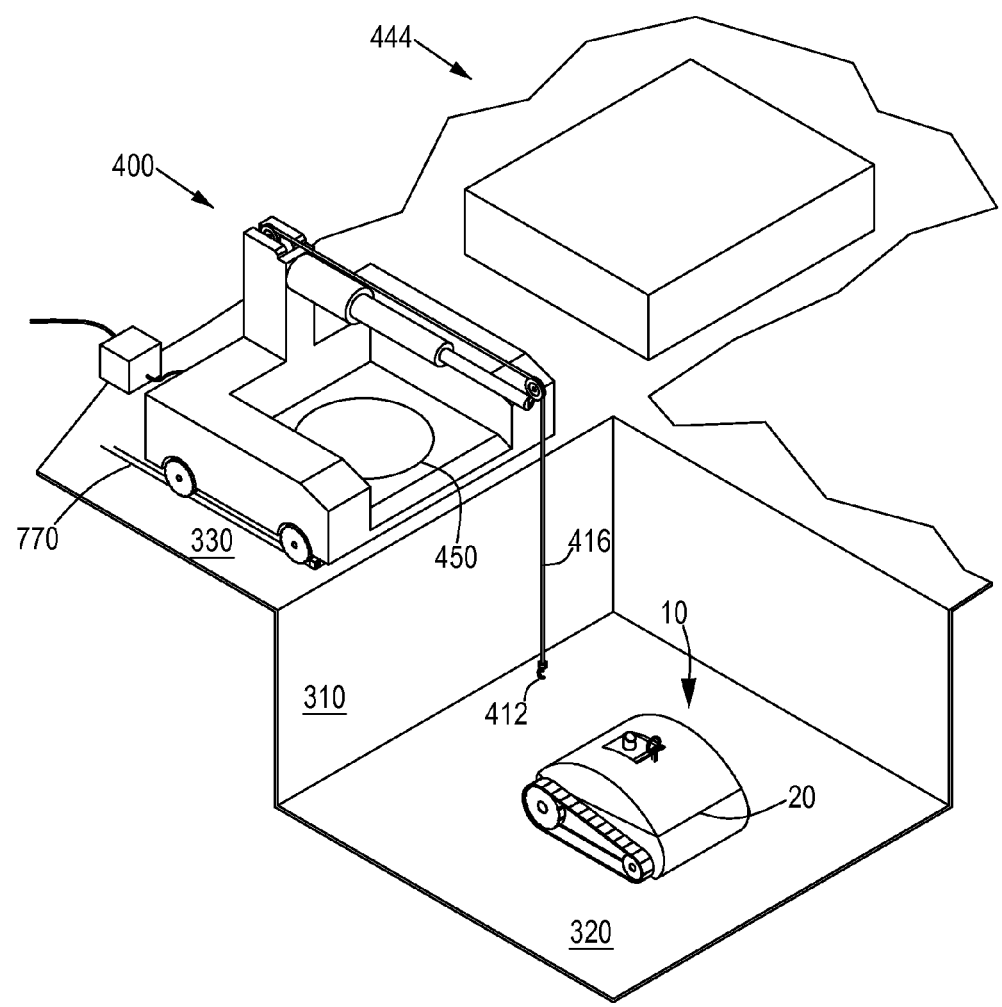
FIG. 5A illustrates a pool cleaning robot that moves on a bottom of a pool towards a hook of a crane according to an embodiment of the invention.
Figure 5B:
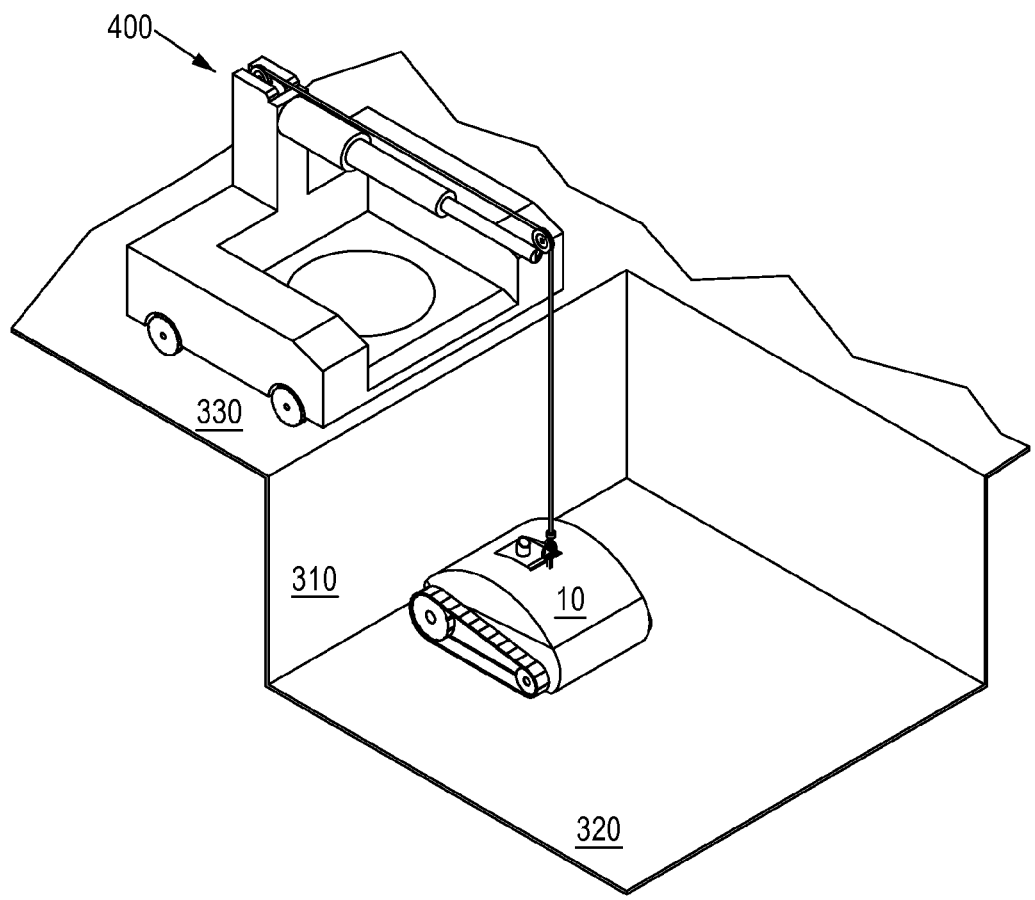
FIG. 5B illustrates a first phase of an exit process during which a pool cleaning robot that is positioned on a bottom of a pool and is connected to a hook of a crane according to an embodiment of the invention.

When the pool cleaning robot interface 392 is at the first position and is coupled to the pool cleaning robot, the pool cleaning robot is within the pool (See, for example, FIG. 5B).

Figure 5C:
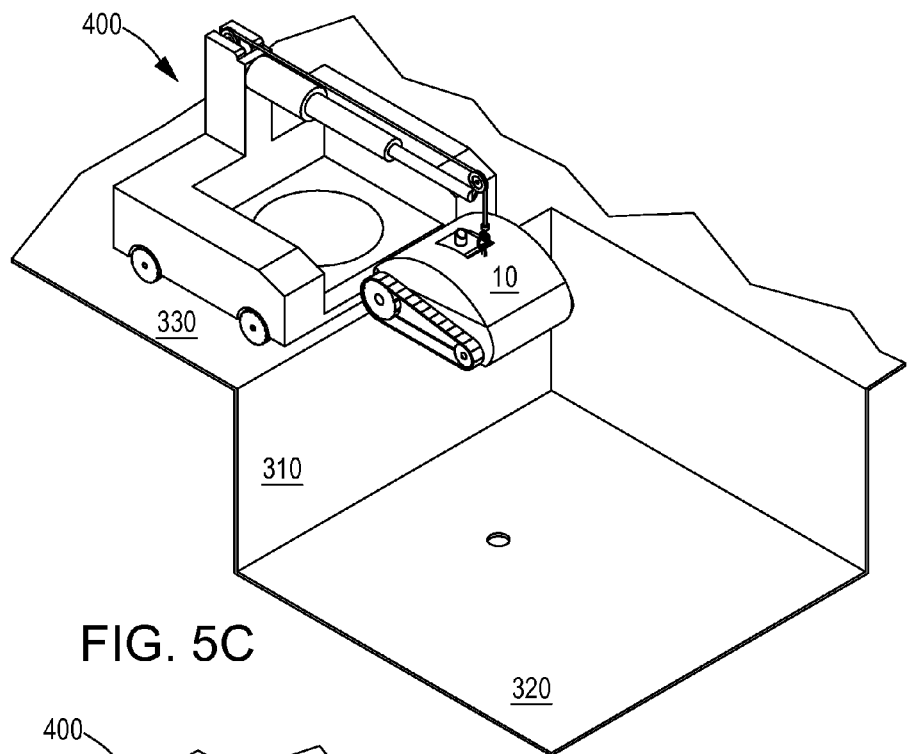
FIG. 5C illustrates a third phase of an exit process during which a pool cleaning robot is extracted from the pool by the crane according to an embodiment of the invention.
Figure 5D:
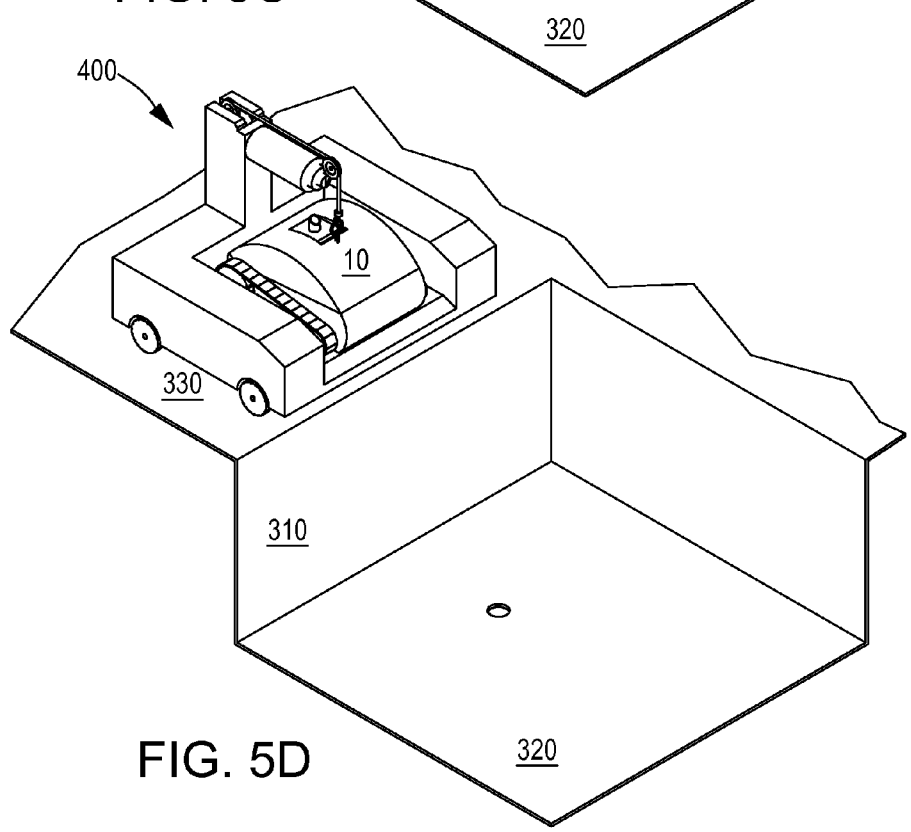
FIG. 5D illustrates a fourth phase of an exit process during which a pool cleaning robot is placed by the crane on a base according to an embodiment of the invention.

When the pool cleaning robot interface 392 is at the second position and is coupled to the pool cleaning robot, the pool cleaning robot is positioned outside the pool (See, for example, FIGS. 5C and 5D).

According to various embodiments of the invention system 390 may include one or more of the following modules: communication module 395, filter cleaning module 391, filter sanitizing module 393, propulsion module 396, pool cleaning robot cleaner 397, pool cleaning robot charging module 398, waste removal module 389 and power supply module 399. These modules may be spaced apart to each other, proximate to each other, integrated together and the like.

The communication module 395 may communicate (directly or indirectly) with the pool cleaning robot—for example by sending beacons that may allow the pool cleaning robot to perform beacon based navigation. Indirect communication may be executed by using intermediate communication devices such as a buoy, a submerged intermediate communication device, a partially submerged intermediate communication device and the like.

The communication module 395 may communicate (directly or indirectly) with another device—for example a mobile device of a user. This may allow a user to program the system 390, to receive status reports from the system, and the like.

The communication module 395 can include ultrasonic transceivers or low frequency radio for communication with the pool cleaning robot.

The filter cleaning module 391 is arranged to clean the filter. Module 393 may direct ultraviolet radiation towards the filter and sanitize it even without removing the filter from the pool cleaning robot. The filter may be removed and then cleaned. The removal may include extracting the filter through the bottom of the pool cleaning robot, as illustrated in PCT patent application serial number PCT/IL2013/051055 titled "AUTONOMOUS POOL CLEANING ROBOT" which is incorporated herein by reference.

Propulsion module 396 is arranged to move the system from one location to the other.

Pool cleaning robot cleaner 397 is arranged to clean the pool cleaning robot—at least its housing. The cleaning can be done using jets of fluid. The fluid may be provided by coupling to any internal or external pool water circulation system and receiving a pressurized stream of fluid.

Charging module 398 is arranged to electrically charge the pool cleaning robot—either in a contactless manner or using contact—connecting a power line or cable to the pool cleaning robot.

FIG. 5A illustrates a first contactless charging element 450 that is positioned on base. The first contactless charging element 450 is arranged to (a) be fed by an electrical supply module 451 and (b) generate an electromagnetic field during at least one period during which a second contactless charging element of the pool cleaning robot is within a charging range from the first contactless charging element 450. The electromagnetic field charges the second contactless charging element (denoted 114' in FIG. 1B).

Crane

FIGS. 4B and 5A-5D illustrates the system as being (or including) a crane 400.

Thus, the hook 412 and rope 416' of the crane act as pool cleaning robot interface and other parts of the crane such as sheaves 414, telescopic arm 410, vertical arm 418 and winding drum 416 form the pool cleaning robot manipulator. The telescopic arm 410 is arranged to move along a horizontal axis. It is noted that the vertical arm 418 may also be a telescopic arm. It is noted that any arrangement of arms is possible. For example, the two arms may be replaced by a single arm that is oriented in relation to the horizon by an angle that differs from ninety degrees. Alternatively, there may be more than two arms, one or both arms may differ from a telescopic arm.

Figure 1D:
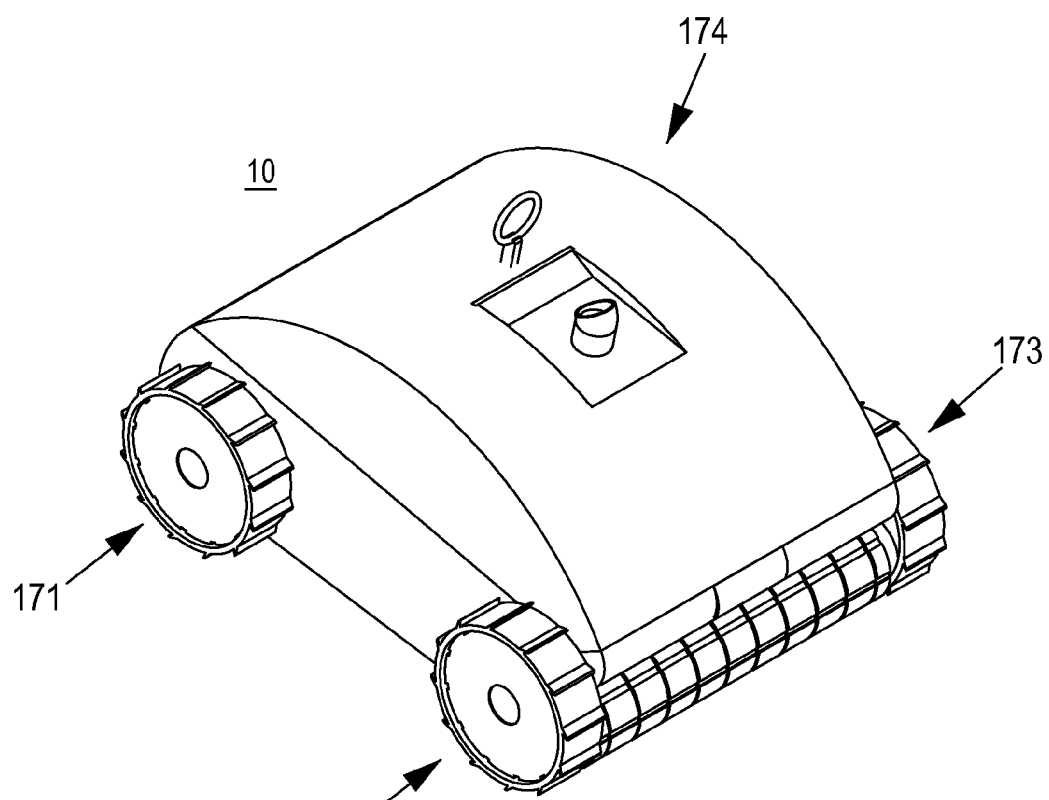
FIG. 1D illustrates a pool cleaning robot according to an embodiment of the invention.

The entire crane may be lowered to be positioned close or at level with the base and built, for example, onto the elevated structure to perform a pull-out of the pool cleaner by means of the winding drum 416 acting as winch that will roll-in the pool cleaner. This may be achieved by means of an interfacing device 200 that may be coupled or connected with the base 420 through winding drum 416. The pool cleaner may climb onto the sidewall interface, attach and cling onto it and be drawn out towards the base 420 to exit the pool. This may be achieved by using interfacing modules group 50 or only two tracks (not shown) or wheels equipped with suitably adapted threads—see FIG. 1D that illustrated a cleaning robot 10 with four wheels 171, 172, 173 and 174—each wheel (also referred to as a drive wheel) may include a non-smooth exterior—it may include threads of other protuberances—that may be shaped to fit a non-smooth surface of an interfacing device (such as interfacing device 200 of FIGS. 2A-2C.

FIGS. 4B and 5A-5D illustrate a crane that is movable (see for example, wheels 422). It can move the pool cleaning robot towards an external docking station 444 (FIG. 5A). Various modules illustrated in FIG. 4A can be located within the docking station 444 and/or included within crane 400 or connected to crane 400 For example, modules 399, 389, 398 and 397 may be included in docking station 444. A non-limiting example of an external docking station is illustrated in U.S. patent application Ser. No. 61/992,247 titled "AUTONOMOUS POOL CLEANING ROBOT WITH AN EXTERNAL DOCKING STATION" which is incorporated herein by reference.

The crane 400 has a base 420 for receiving the pool cleaning robot after said pool cleaning robot was lifted or exited from the pool. The base is illustrated as a flat surface that is surrounded from three sides by an elevated structure 430. Other bases may be used. For example—the base may include at least one of the filter cleaning module 391 and filter sanitizing module 393.

It is noted that the base 420 may not be included in the crane 400. In this case the crane can position the pool cleaning robot at the base. Additionally or alternatively, the pool cleaning robot, after being extracted from the pool can drive itself to the base 420. It is also noted that the base 420 may be an area of the external surface.

The base 420 may include a mechanism for conductive based charging (see for example element 450 of FIG. 5A) or connection based charging when the robot is at its docking station and/or on its base. The base 420 may receive electrical power from various optional sources of power supply module 399 (or from a base power supply module) such as a transformer connected to mains AC supply (depicted in FIG. 5A) and/or rechargeable batteries that are fed by solar panels.

If base 420 is separated from the crane then each one of base 420 and crane 400 may include at least one out of modules 391-399.

According to an embodiment of the invention at the end of the charging process and/or replacing the filter and/or when the user wants to start a cleaning cycle, the pool cleaning robot can detect the location of the entrance to the pool using a sensor and the path to pass for entering the pool if the base and/or the docking station are spaced apart from the pool.

Alternatively, if the user placed the base close to the pool (for example, 3 meters from the pool's edge) the robot can—upon receiving communication from pool cleaner to initiate pool cleaner exit procedures—be directed and perform an approach to the pool edge using by travelling on skids (denoted 770 in FIG. 5A) with wheels stoppers (not shown) at the skids' ends to prevent base and/or crane from accidentally continuing the travel and falling into the water. The skids and stopper may also comprise a magnetic strip. Any element capable of stopping the movement of the pool cleaning robot may be used as a stopper.

The skids may be constructed from a foldable strip roll (not shown) that is attached to the bottom of base 420 and to the front wheels 422 in a manner that the foldable skid strip will be automatically deployed/retracted the moment the embodiments of base 420 or crane 400 or docking station 444 or system 470 are automatically set in either a, respectively, forward or a backward travel motion to or from the pool.

Power supply module 399 can include at least one out of input port 443 and turbine 441 (rotated by fluid provided from a pool fluid circulation system or from a garden hose), and may include a battery 442', a controller (not shown), and the like.

According to an embodiment of the invention the crane can be powered at least in part by a pool circulation system that is arranged to circulate fluid in the pool. Turbine 441 may be arranged to convert a flow of fluid supplied by the pool circulation system or from a garden hose to an electrical power generator that is then fed to charge a battery and/or drive an electrical motor. An example is illustrated in PCT patent application PCT/IL2013/051055 which is incorporated herein by reference.

The propulsion module 396 may include motor 461 and a transmission system 462. The transmission system 462 is arranged to couple the motor 461 to winding drum 416 and to a wheels 442 or tracks of a propulsion module 396.

Interfacing Device Winding and Unwinding Mechanism

According to an embodiment of the invention there may be provided a system that is arranged to provide an interfacing device on which the cleaning robot may climb when exiting the pool.

FIGS. 2A-2C illustrated an interfacing device 200 without showing how the interfacing device 200 is positioned. It is noted that the interfacing device 200 may be static, may be positioned by a person or may be positioned and removed automatically.

Figure 4C:
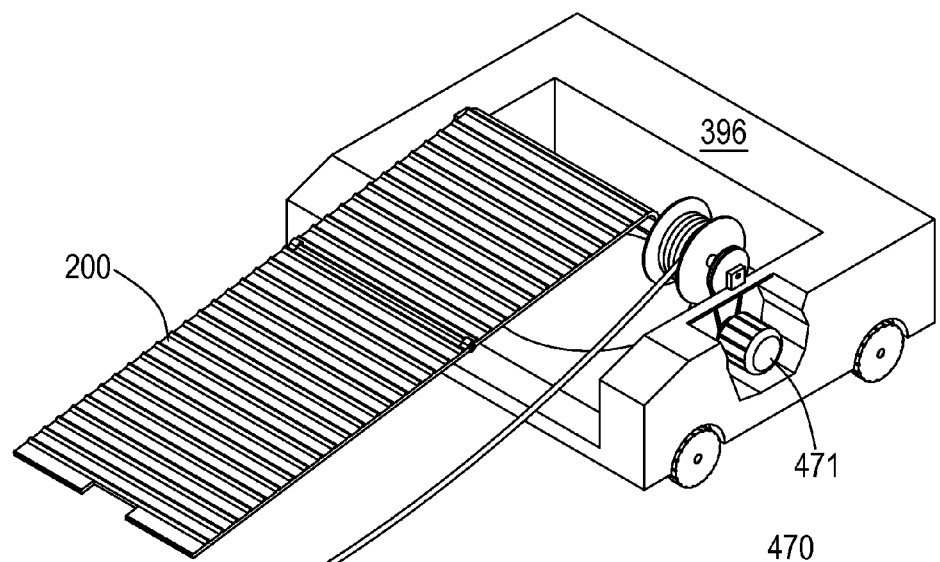
FIG. 4C illustrates a system according to an embodiment of the invention.

FIG. 4C illustrates a system 470 that is arranged to wind and unwind an interfacing device that may be interfaced by a pool cleaning robot once the pool cleaning robot exits the pool.

System 470 includes an interfacing device 200, winding and unwinding mechanism 471 and a propulsion module 396. It may include one or more elements out of the elements (389, 391-299) illustrated in FIG. 4A.

Any winding and unwinding mechanism 417 known in the art may be provided. The winding and unwinding mechanism may include one or more shafts, one or more motors, one or more transmission mechanisms (such as gears), and the like. Non-limiting examples of winding and unwinding mechanisms are shown in US patent application 20130092779, US patent application 2010/0170032 of Sproatt, U.S. Pat. No. 4,675,922 of Colin, and US patent application 20010034906 of Last, all being incorporated herein by reference.

The interfacing device 200 is connected to a winding and unwinding mechanism 471 that is arranged to rotate a shaft in different directions thereby winding or unwinding the interfacing device 200. The interfacing device 200 may be elastic and/or made of multiple parts (such as ribs or slats) that may move in relation to each other during the winding and/or unwinding mechanism. The winding and/or unwinding mechanism may use any motor—hydraulic, electrical, solar powered, and the like The interfacing device 200 may be unwound when the system 470 is in a predefined distance from the pool edge (that predefined distance may be the length of the external surface interface 210 of interfacing device 200). The external surface interface 210 is positioned on an external surface 330 that is external to the pool.

System 470 may be driven to another predefined distance (for example—1, 2, 3 meters from the edge of the pool) after the interfacing device 200 is not in use (and is wrapped around the shaft).

The winding and unwinding mechanism 471 that is arranged to rotate a shaft may include a pool cleaner electrical power cable winding drum.

Elevator

FIGS. 6A-6B, 7A-7C, 8A-8F and 9A-9E illustrates the system as being an elevator.

Referring to FIGS. 6A-6B and 7A-7C, the elevator 500 includes a pool cleaning robot interface such as a ramp 510 on which the pool cleaning robot can mount and also includes a pool cleaning robot manipulator that include other elements of the elevator 500 that may lower or elevate the ramp 510. The depicted ramp may be of a different configuration/shape such as arms, gripper and the like. The ramp 510 may include a contactless charging element 515 that may wirelessly charge the cleaning robot once the cleaning robot is on the ramp 510.

The elevator 500 can be fed by fluid (via conduit 540) from the pool circulation system or from another source (for example from a pipe or hose 540 of a garden irrigation system). The fluid flows through a fluid path and may enter the pool thereby rotating a turbine that generates electricity to be fed to a motor of the elevator or to a battery that may feed that motor. The fluid flow may activate pistons of a water motor providing the necessary torque to rotate a shaft and gear mechanism that will operate the elevator. A non-limiting example of a water motor is illustrated in U.S. patent application Ser. No. 13/275,359 titled "Pool Cover Winding System Using Water-Powered Piston Motor" which is incorporated herein by reference.

According to an embodiment of the invention the elevator may include an elevator housing (530 in FIG. 6A) that may at least partially surround an elevator motor (760 in FIGS. 8A-8C and in FIG. 9), elevator transmission system (collectively denoted 750 in FIG. 8A) and an elevating and descending interface (denoted 520 in FIGS. 6A, and 8A) that is elevated and is descended by the transmission system and is connected to a pool cleaning robot interface (such as ramp 510 of FIGS. 6A, 7A-7C, 8A,8B and 9) that supports a pool cleaning robot that is elevated and/or descended by the elevator.

The elevator housing (530 in FIG. 6A) is shown as being partially covered by a pair of covers 622 and 624. Elevating and descending interface 520 may extend through a gap formed between these covers 622 and 624.

The elevator housing may be vertical rod or plastic central hollow tube (denoted 530 in FIG. 6A) having its bottom touching the bottom of the pool—or positioned above the bottom without contacting the bottom.

The elevator housing can be made modular, telescopic and the like. It may be of fixed or variable length. The elevator housing may be made of several plastic tubes which are connected to each other. A user can determine the aggregate length of the elevator housing in response to the position of the elevator in the pool in response to the depth of the water. The elevator housing can be secured to a pool sidewall using rubber or plastic clamps and one or more suction cups securing the coupling side.

Figure 6A:
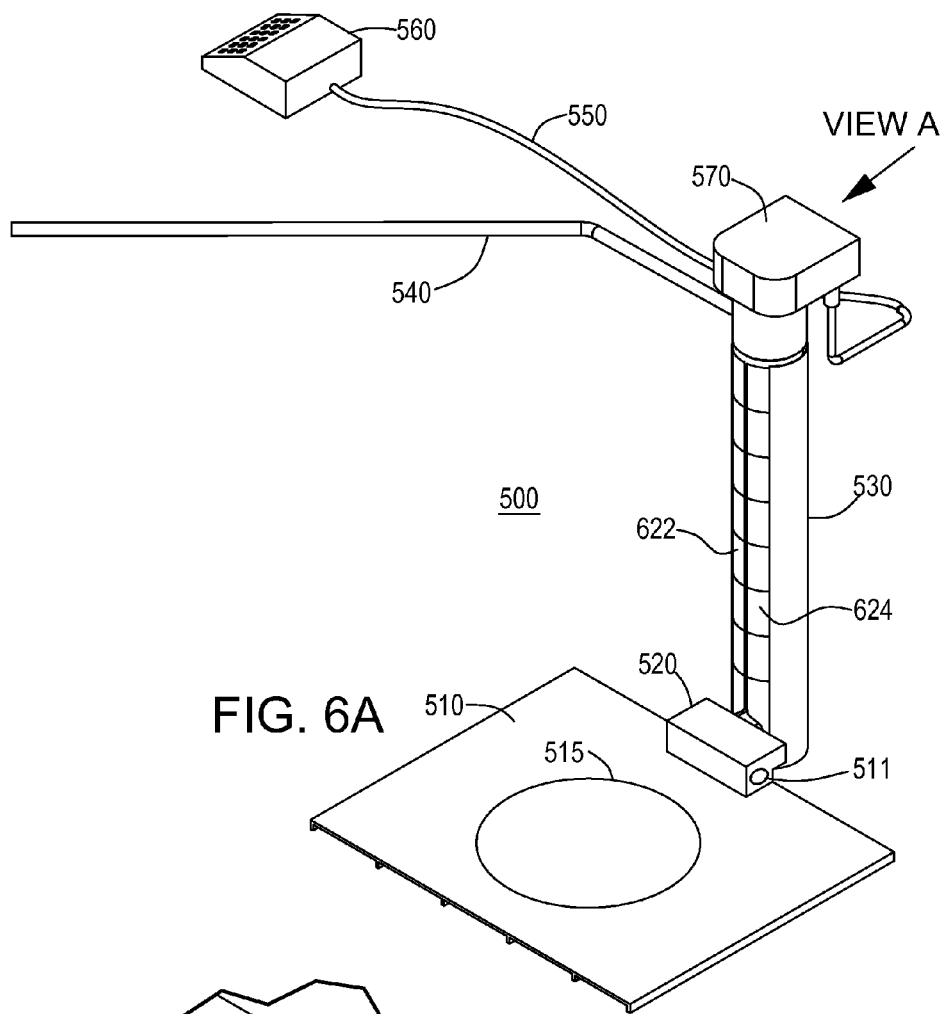
FIG. 6A illustrates an elevator for extracting a pool cleaning robot, according to an embodiment of the invention.

The elevator housing may include a buffering element such as a partially overlapping safety curtain—that can be seen in FIG. 6A. Its purpose is to both protect the internal elevator housing mechanisms from dirt penetration and from easy access to said mechanism and its moving parts.

Figure 7A:
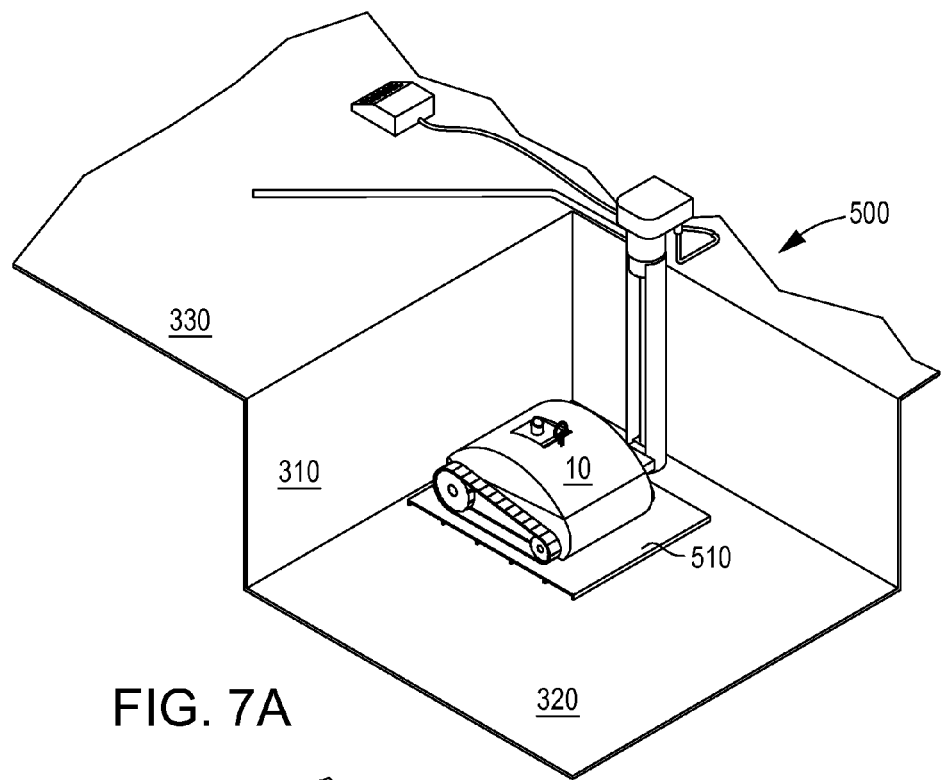
FIG. 7A illustrates a first phase of an exit process during which after location identification and navigation to a pool cleaning robot is positioned on a ramp of an elevator that is positioned in proximity to a bottom of a pool according to an embodiment of the invention.
Figure 7B:
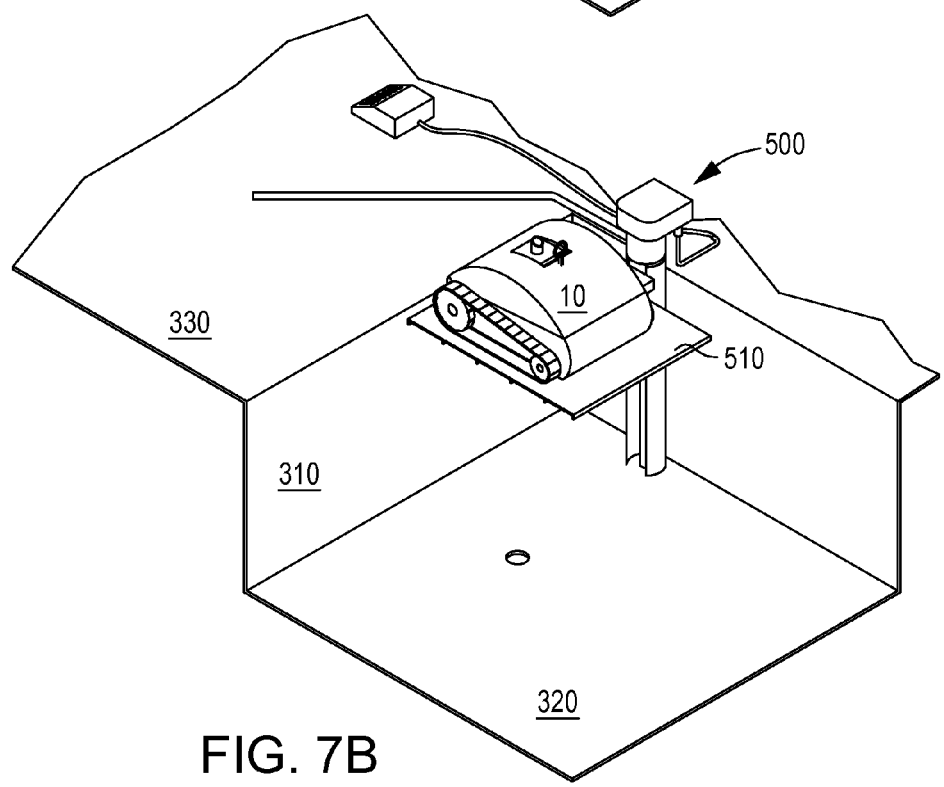
FIG. 7B illustrates a second phase of an exit process during which a pool cleaning robot is positioned on a ramp of an elevator that is positioned above the pool edge according to an embodiment of the invention.
Figure 7C:
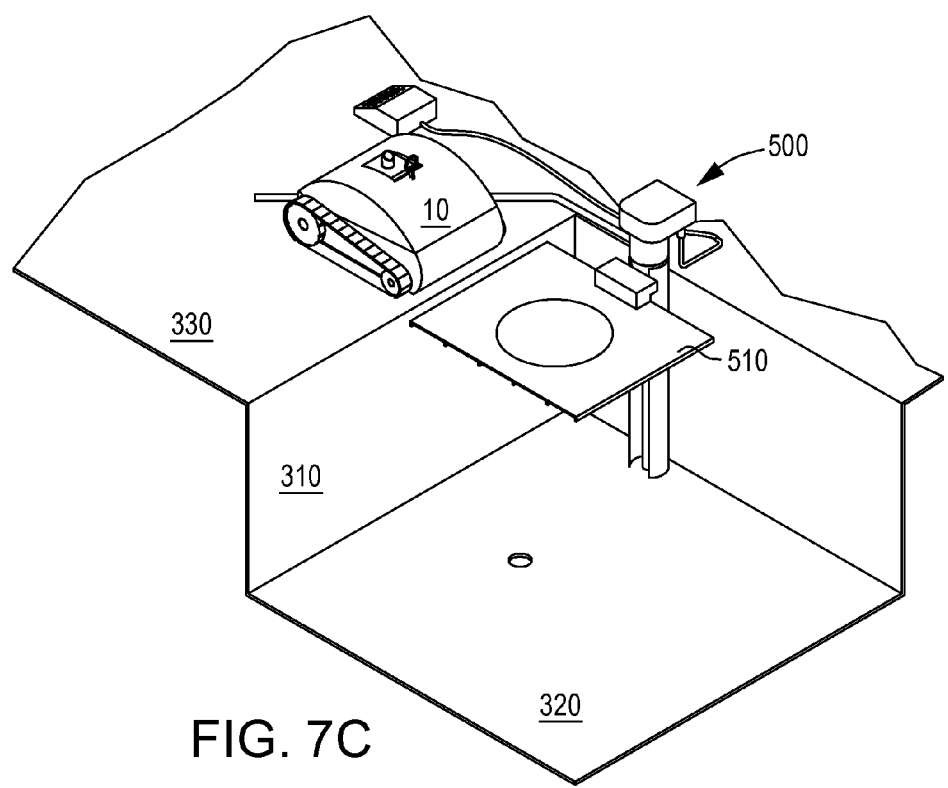
FIG. 7C illustrates a third phase of an exit process during which a pool cleaning robot drives away from a ramp of an elevator according to an embodiment of the invention.
Figure 8A:
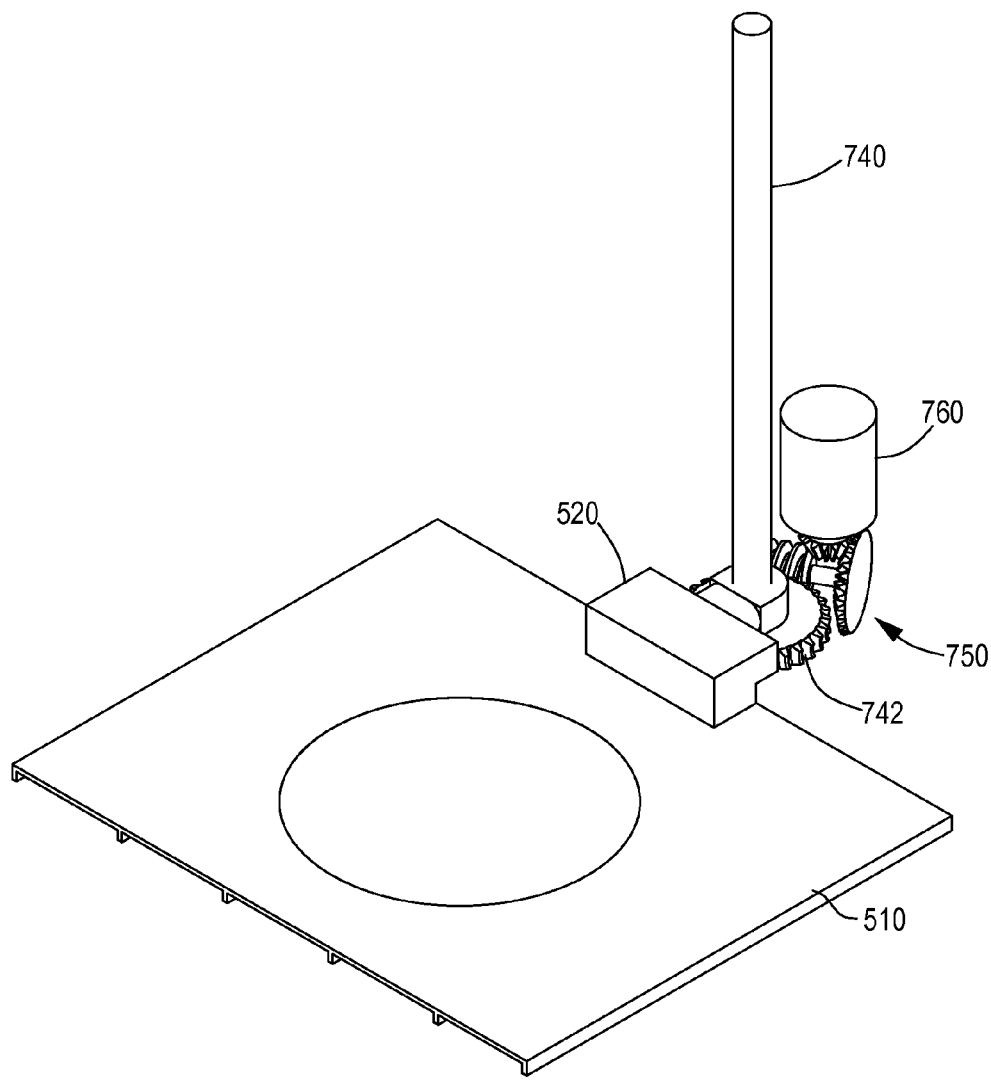
FIGS. 8A-8C illustrate an elevator and various portions of the elevator according to various embodiments of the invention.
Figure 8B:
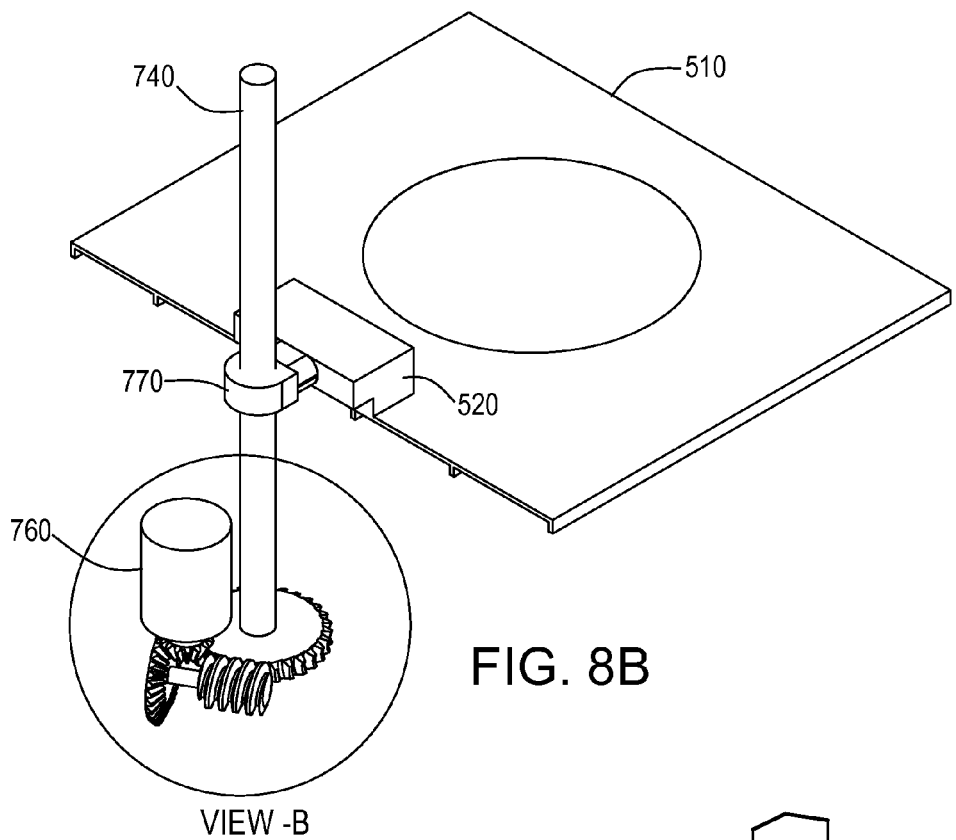
Figure 8C:
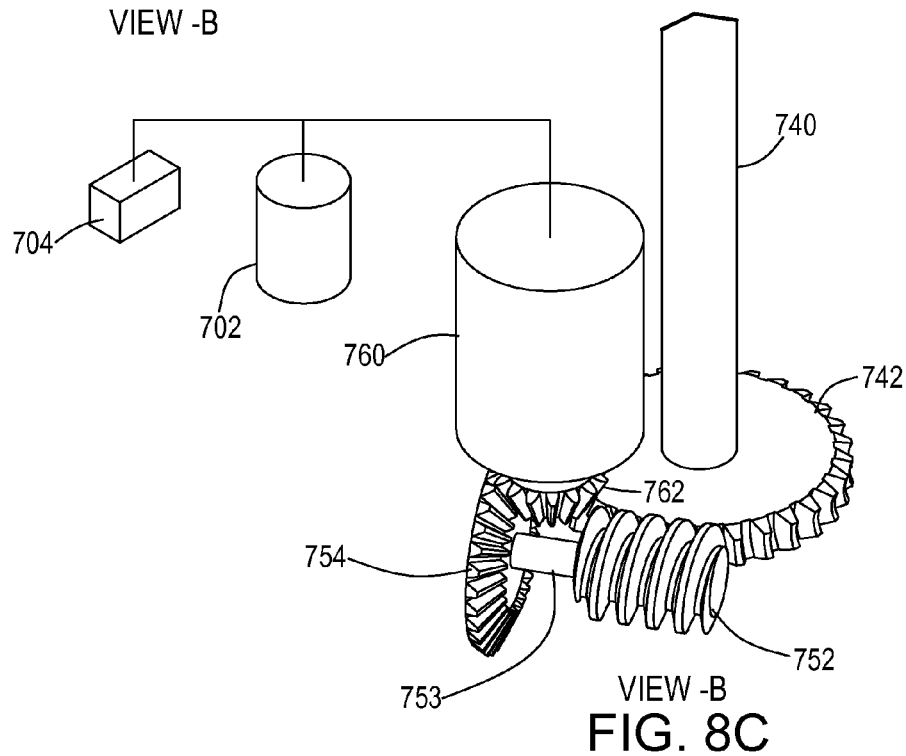

FIGS. 7A-7C illustrate the pool cleaning robot that is positioned on a ramp 510 that is positioned in proximity to the bottom of the pool—at a lowest point. FIG. 7B illustrate the pool cleaning robot that is positioned on a ramp 510 that is positioned in proximity to the upper edge of the sidewall of the pool—at a highest point. The pool cleaning robot may then exit the ramp and drive to a docking station.

Any type of elevator may be provided. The elevator may be powered by electricity (it may receive power via a submerged or above the water cord) and/or may generate its own power using a hydroelectric system that may include a turbine that is rotated by a flow of fluid emanating from a water garden hose. A water motor may be positioned externally above water or submerged inside the elevator housing providing the necessary torque.

The ramp 510 can be activated by using water pressure—based on the use of water which is injected to the pool through the jets which are leading filtered water from the main pool filter. At about the middle of the tube there is an opening that includes a flexible rubber hose which is pressure- and chemicals resistant and is connected to the jet emission. The mechanism inside the elevator housing may be arranged to convert water pressure jet power to mechanical power to operate a generator that will supply and store electrical power in the battery 704 in which can power a motor to move the ramp up and down. When the ramp is not in operation, there is a bypass valve allowing jet water to flow freely back to the pool.

Inside the housing there may be provided a turbine that will motivate propulsion machinery—by Gear and chalk/axis snail—a central axis which is to be connected to the ramp and that will drive the axle and ramp up, down and round. The ramp can be moved towards the top and/or bottom of the pipe and to rotate (for example by 180 degrees) to allow robot to go down the ramp onto the pool edge or deck. The snail mechanism can be placed at the top of the tube, it will be activated electrically and be managed by using sensors (pressure) and an electronic control unit.

The system can be connected and dismantled using a quick and simple Universal connection to the jet and/or pool walls.

The elevator can be fed from the hydraulic power of the jet, can be powered by an engine and/or dedicated gear.

The download/upload of the robot to/out of the pool can be controller and/or monitored by a human using remote control/communication.

FIGS. 8A-8C and 9 illustrate an electrical motor 760 that is coupled to a turbine 702 and a generator/battery 704 for receiving and storing power. The motor may be a water motor, a turbine (without generator/battery 704.

FIGS. 8A-8C and 9 illustrate a transmission system 750 that includes a rotating rod 740 that ends with a first gear 742, first and second intermediate gears 752 and 754 that are connected to each other by a pole 753 and a motor gear 762 that is rotated by motor 760. Motor gear 762 meshes with second intermediate gear 754 to form a first transmission. First intermediate gear 752 and first gear 742 mesh with each other to provide a second transmission.

The motor 750 rotates the motor gear and the first and second transmissions cause first gear to rotate and thereby rotate rotating rod 740. The entire transmission system 750 may be located inside the elevator housing underneath elevator head 570.

The rotation of the rotating rod 740 causes the elevating and descending interface 520 to elevate or descend. For example—the direction of movement may depend upon the direction of rotation of the rotating rod. Any type of transmission of transmitting the rotation of rotating rod 740 to a change in the height of the elevating and descending interface 520 can be used, including spiral or helical winding and including supporting/aligning or guiding mechanism When the ramp reaches above the edge of the pool it may be automatically rotated (for example by 180 degrees) so as to face the exterior of the pool but it may also remain static or perform any other movement.

Figure 9:
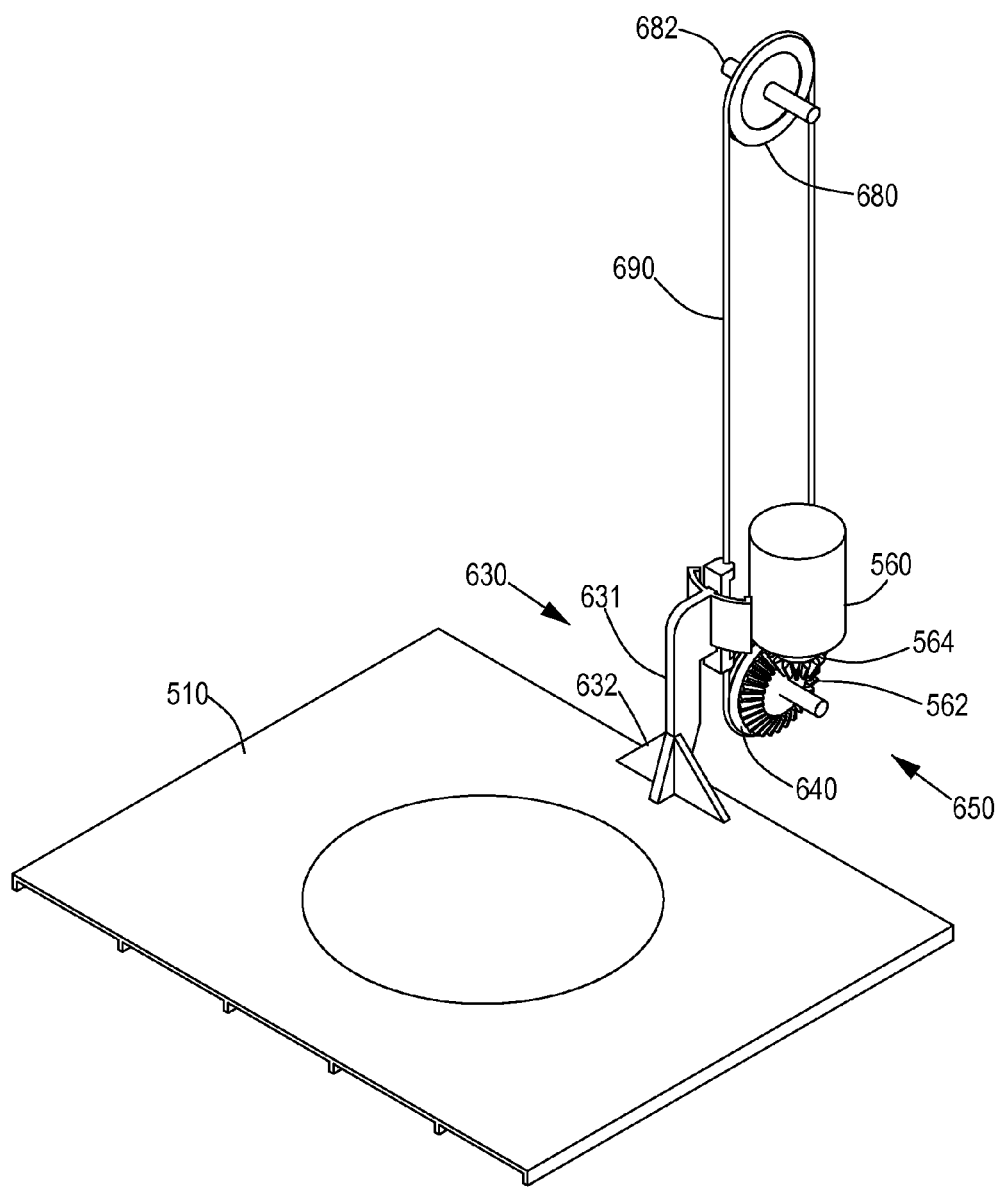
FIG. 9 illustrates some portions of an elevator according to an embodiment of the invention.

FIG. 9 illustrates a transmission system 650 that is connected between motor 560 and elevating and lower wheel 640. An elevating and descending interface includes a vertical plate 631 is connected to a loop 690 of a rope/cable that is rotated by the lower wheel 640 that is rotated by the transmission system 680. The vertical plate 631 is connected to a ramp interface 632 that is connected to ramp 510.

The upper wheel 680 rotates about axis 682 which is supported by an upper support element (not shown) that enables it to rotate while maintaining a distance from the lower wheel that is connected to a gear of the transmission system 650.

The lower wheel 640 may rotate about a lower axis (not shown) which is connected to a beveled gear 562 that meshes with (and is rotated by) motor gear 564—both gears belong to the transmission system 560. Motor 560 rotates the motor gear 564 that in turn rotates the lower wheel 640 that rotate (by loop 690) the upper wheel 680.

The rotation of the rope causes the elevating and descending interface 630 to be elevated or be descended—according to the direction of rotation.

The elevator of any one of FIGS. 6A-6B, 7A-7C, 8A-8C and 9 may have sensors (for example pressure sensors or proximity sensors) for sensing when the pool cleaning robot positioned itself on ramp 510. This may trigger the elevation of the pool cleaning robot (when ramp is in its downward position) or a descending of the pool cleaning robot (when the pool cleaning robot moves from an exterior of the pool on the ramp).

Any elevator may be programmed, locally controlled or remote controlled.

Figures

Figure 6B:
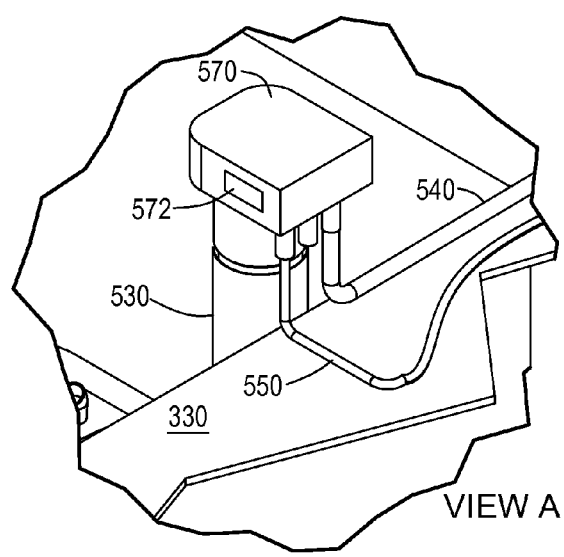
FIG. 6B illustrates a head of elevator for extracting a pool cleaning robot, according to an embodiment of the invention.

FIGS. 6A-6B illustrates elevator 500 as being connected by wire 550 to a programming console with or without a power supply 560 (which can be a dedicated device or a general purpose device such as a laptop, a mobile phone and the like). It is noted the wire is an example and wireless communication can be provided.

FIGS. 6A-6B illustrates elevator 500 as having an elevator head 570 that may be outside the water and provide an interface with a water garden hose for receiving fluid that may comprise a set of solenoids to direct water flows to activate a hydraulic motor for an automatic or manual ascent or descent of ramp 510 as per programming console 560 such as illustrated for example in FIGS. 13, 14 and 15 and/or in U.S. Ser. No. 13/275,359 titled Pool Cover Winding System Using Water-Powered Piston Motor and which is herein incorporated in its entirety; and an interface with communication and/or power cables. A controller 572 of the elevator, in conjunction or without conjunction to programming console 560, may be positioned in the elevator head 570 or in any other location.

The ramp 510 may include a pressure sensor 511 which activates the mechanism for rotating ramp to be positioned at a certain distance from the edge of the pool. After alignment, the ramp 510 may begin to decline slowly into the water to the bottom of the pool. The slowness is designed to allow either trapped air to escape from the pool cleaning robot body or for trapped water to exit said body. When the ramp reaches its lowest or highest position the robot drives away from the ramp.

The robot, after a completion of a pool cleaning cycle may detect—using a sensor (or without a sensor)—the position of the ramp and then travel to it and settle on it. A pressure sensor of the ramp activates the mechanism that raises the ramp. When the ramp reaches the head of the rod/main elevator housing the robot can be rotated (by the ramp) (for example by 180 degrees)—from the inner side of the pool to the outer side of the pool onto the pool deck. The robot can then navigate and move itself towards the docking station.

Managing Waste

The robot or the docking station can detect full filters (at least full or clogged at a certain level). The fullness level can be sensed by sensors, suction sensing and the like).

These filters, after being outputted from the robot can be either manually or automatically taken away from the docking station or robot.

The robot may include within its housing and near the filter a UVC bulb for irradiating the filters.

The robot can be equipped with an option to receive commands/data transfer mechanism transmits/receives underwater, underwater transmitter to the receptor transmits/receives out of the water to the power supply and/or remote control/smartphones. The remote control can be supplied and dedicated to the robot or can be a general purpose device such as a smartphone.

When the robot undergoes an automatic cleaning cycle, the remote control can be used for manually control the robot. The robot can also enable and change parameters of different cleaning programs such as cleaning cycle time, climbing wall or no wall climbing, traveling slower for a thorough cleaning or a quick trip, running the robot in delay and more.

The remote control can communicate directly or indirectly with the robot.

The robot can communicate with sensors, intermediate communication devices that receive or transmit activation commands and/or data from/to the user. The power supply may include a mechanism for Bluetooth, which can transmit to a dedicated server.

Buoy—the buoy may be used for exchanging operating commands and/or data to the robot. In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements the mere fact that certain measures are recited in mutually different claims does not indicate that a combination of these measures cannot be used to advantage.

Any system, apparatus or device referred to this patent application includes at least one hardware component.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A system for extraction of a pool cleaning robot from a pool, the system comprises:
a pool cleaning robot interface that is arranged to be coupled to a pool cleaning robot during an exit process during which the pool cleaning robot is extracted from the pool; and a pool cleaning robot manipulator that is coupled to the pool cleaning robot interface, wherein the pool cleaning robot manipulator is arranged to move the pool cleaning robot interface between a first and second portion; wherein when the pool cleaning robot interface is at the first position and is coupled to the pool cleaning robot, the pool cleaning robot is within the pool; wherein when the pool cleaning robot interface is at the second position and is coupled to the pool cleaning robot, the pool cleaning robot is positioned outside the pool;
wherein the pool cleaning robot manipulator and the pool cleaning robot interface are included in a crane; and
wherein the crane comprises an arm that has an arm end that is movable along a horizontal axis.

2. The system according to claim 1 further comprising a pool cleaning robot base; wherein the crane is arranged to position the pool cleaning robot on the pool cleaning robot base.

3. The system according to claim 1 further comprising a first contactless charging element that is arranged to (a) be fed by the electrical supply module and (b) generate an electromagnetic field during at least one period during which a second contactless charging element of the pool cleaning robot is within a charging range from the first contactless charging element, and wherein the electromagnetic field charges the second contactless charging element.

4. A system for extraction of a pool cleaning robot from a pool, the system comprises: a pool cleaning robot interface that is arranged to be coupled to a pool cleaning robot during an exit process during which the pool cleaning robot is extracted from the pool; and a pool cleaning robot manipulator that is coupled to the pool cleaning robot interface, wherein the pool cleaning robot manipulator is arranged to move the pool cleaning robot interface between a first and second portion; wherein when the pool cleaning robot interface is at the first position and is coupled to the pool cleaning robot, the pool cleaning robot is within the pool; wherein when the pool cleaning robot interface is at the second position and is coupled to the pool cleaning robot, the pool cleaning robot is positioned outside the pool; wherein the pool cleaning robot manipulator and the pool cleaning robot interface are included in a crane; wherein the crane is powered at least in part by a pool circulation system that is arranged to circulate fluid in the pool.

5. The system according to claim 4 wherein the crane comprises a turbine that is arranged to convert a flow of fluid supplied by the pool circulation system to an electrical power.

6. The system according to claim 1 comprising a motor and a transmission system, wherein the transmission system is arranged to couple the motor to a pulley of the crane and to a wheels or tracks of a system drive system.

7. A system for extraction of a pool cleaning robot from a pool, the system comprises: a pool cleaning robot interface that is arranged to be coupled to a pool cleaning robot during an exit process during which the pool cleaning robot is extracted from the pool; and a pool cleaning robot manipulator that is coupled to the pool cleaning robot interface, wherein the pool cleaning robot manipulator is arranged to move the pool cleaning robot interface between a first and second portion; wherein when the pool cleaning robot interface is at the first position and is coupled to the pool cleaning robot, the pool cleaning robot is within the pool; wherein when the pool cleaning robot interface is at the second position and is coupled to the pool cleaning robot, the pool cleaning robot is positioned outside the pool; wherein the pool cleaning robot manipulator is an elevator drive system.

8. The system according to claim 7 wherein the pool cleaning robot interface is a supporting element that is arranged to support the pool cleaning robot when the pool cleaning robot is positioned on the supporting element.

9. The system according to claim 8 further comprising a supporting element manipulator for moving the supporting element between a folded position and an unfolded position.

10. The system according to claim 8 wherein the elevator drive system is powered at least in part by a pool circulation system that is arranged to circulate fluid in the pool.

11. The system according to claim 10 wherein the elevator drive system comprises a turbine that is arranged to convert a flow of fluid supplied by the pool circulation system to an electrical power.

12. A system for extraction of a pool cleaning robot from a pool, the system comprises: a pool cleaning robot interface that is arranged to be coupled to a pool cleaning robot during an exit process during which the pool cleaning robot is extracted from the pool; and a pool cleaning robot manipulator that is coupled to the pool cleaning robot interface, wherein the pool cleaning robot manipulator is arranged to move the pool cleaning robot interface between a first and second portion; wherein when the pool cleaning robot interface is at the first position and is coupled to the pool cleaning robot, the pool cleaning robot is within the pool; wherein when the pool cleaning robot interface is at the second position and is coupled to the pool cleaning robot, the pool cleaning robot is positioned outside the pool; wherein the system further comprises a washing device for washing the pool cleaning robot, when the pool cleaning robot is out of the pool.

13. A system for extraction of a pool cleaning robot from a pool, the system comprises: a pool cleaning robot interface that is arranged to be coupled to a pool cleaning robot during an exit process during which the pool cleaning robot is extracted from the pool; and a pool cleaning robot manipulator that is coupled to the pool cleaning robot interface, wherein the pool cleaning robot manipulator is arranged to move the pool cleaning robot interface between a first and second portion; wherein when the pool cleaning robot interface is at the first position and is coupled to the pool cleaning robot, the pool cleaning robot is within the pool; wherein when the pool cleaning robot interface is at the second position and is coupled to the pool cleaning robot, the pool cleaning robot is positioned outside the pool; wherein the system further comprises a charging device for charging the pool cleaning robot, when the pool cleaning robot is out of the pool.

14. A system for extraction of a pool cleaning robot from a pool, the system comprises: a pool cleaning robot interface that is arranged to be coupled to a pool cleaning robot during an exit process during which the pool cleaning robot is extracted from the pool; and a pool cleaning robot manipulator that is coupled to the pool cleaning robot interface, wherein the pool cleaning robot manipulator is arranged to move the pool cleaning robot interface between a first and second portion; wherein when the pool cleaning robot interface is at the first position and is coupled to the pool cleaning robot, the pool cleaning robot is within the pool; wherein when the pool cleaning robot interface is at the second position and is coupled to the pool cleaning robot, the pool cleaning robot is positioned outside the pool; wherein the system further comprises a filter exchanging device for exchanging a filter of the pool cleaning robot, when the pool cleaning robot is out of the pool.

15. A system for extraction of a pool cleaning robot from a pool, the system comprises: a pool cleaning robot interface that is arranged to be coupled to a pool cleaning robot during an exit process during which the pool cleaning robot is extracted from the pool; and a pool cleaning robot manipulator that is coupled to the pool cleaning robot interface, wherein the pool cleaning robot manipulator is arranged to move the pool cleaning robot interface between a first and second portion; wherein when the pool cleaning robot interface is at the first position and is coupled to the pool cleaning robot, the pool cleaning robot is within the pool; wherein when the pool cleaning robot interface is at the second position and is coupled to the pool cleaning robot, the pool cleaning robot is positioned outside the pool; wherein the pool cleaning robot manipulator is powered at least in part by a pool circulation system that is arranged to circulate fluid in the pool.

16. A system for extraction of a pool cleaning robot from a pool, the system comprises: a pool cleaning robot interface that is arranged to be coupled to a pool cleaning robot during an exit process during which the pool cleaning robot is extracted from the pool; and a pool cleaning robot manipulator that is coupled to the pool cleaning robot interface, wherein the pool cleaning robot manipulator is arranged to move the pool cleaning robot interface between a first and second portion; wherein when the pool cleaning robot interface is at the first position and is coupled to the pool cleaning robot, the pool cleaning robot is within the pool; wherein when the pool cleaning robot interface is at the second position and is coupled to the pool cleaning robot, the pool cleaning robot is positioned outside the pool; wherein the system further comprises a propulsion system for moving the system in relation to the pool.

* * * * *